Sept. 11, 1962 B. J. NIGRELLI ETAL 3,053,025
CASE LOADER
Filed Feb. 29, 1960 12 Sheets-Sheet 1

INVENTORS
BIAGIO J. NIGRELLI
WENDELL E. STANDLEY
RICHARD B. WITTMANN
JAMES I. WITTMANN
BY E. A. Wagoneller
ATTORNEY Sept. 11, 1962   B. J. NIGRELLI ETAL   3,053,025
CASE LOADER
Filed Feb. 29, 1960   12 Sheets-Sheet 2
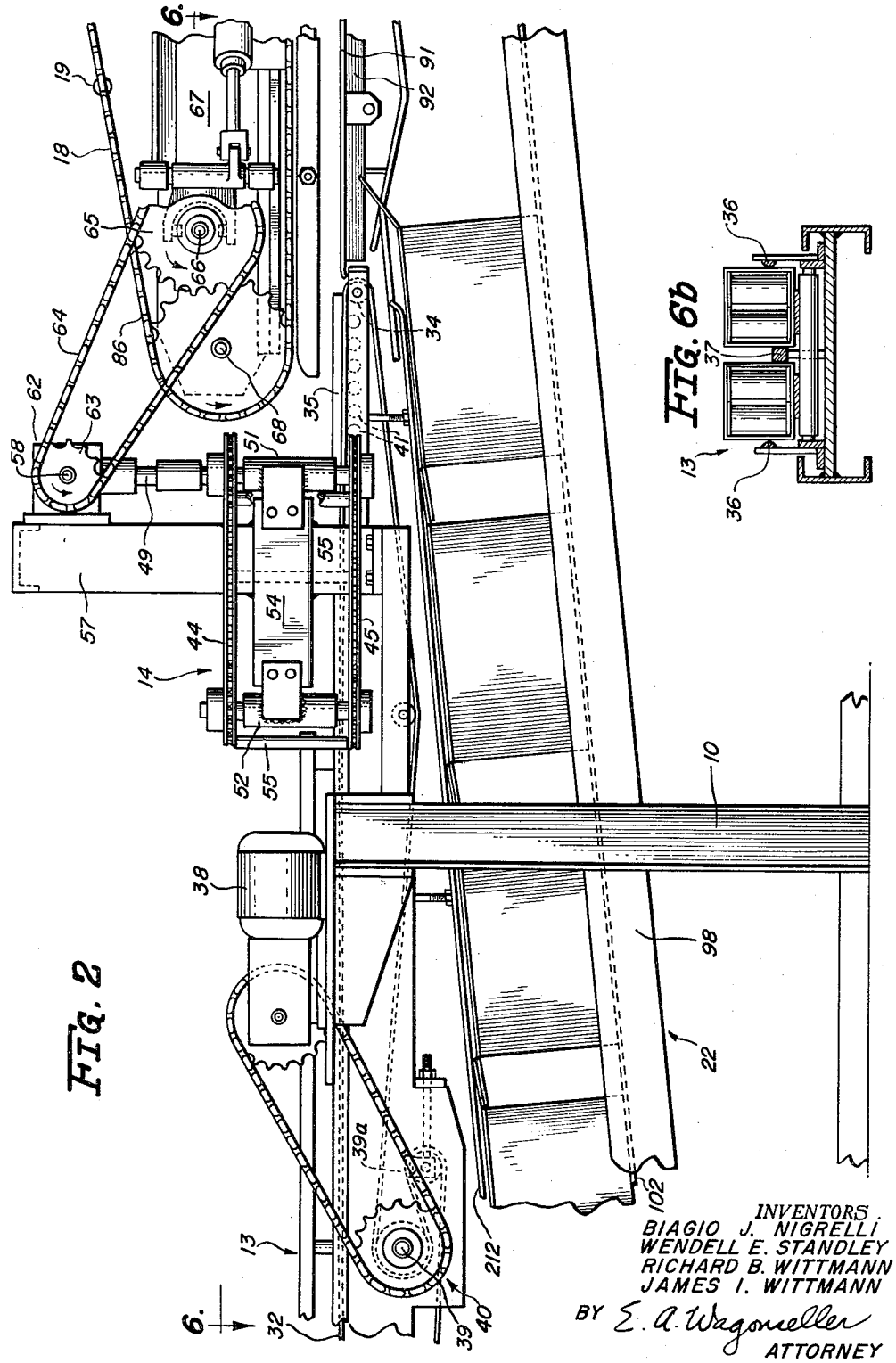
INVENTORS.
BIAGIO J. NIGRELLI
WENDELL E. STANDLEY
RICHARD B. WITTMANN
JAMES I. WITTMANN
BY E. A. Wagoneller
ATTORNEY INVENTORS
BIAGIO J. NIGRELLI
WENDELL E. STANDLEY
RICHARD B. WITTMANN
JAMES I. WITTMANN
BY E. A. Wagonseller
ATTORNEY Sept. 11, 1962 B. J. NIGRELLI ETAL 3,053,025
CASE LOADER
Filed Feb. 29, 1960 12 Sheets-Sheet 5

INVENTORS
BIAGIO J. NIGRELLI
WENDELL E. STANDLEY
RICHARD B. WITTMANN
JAMES I. WITTMANN
BY E. A. Wagonseller
ATTORNEY

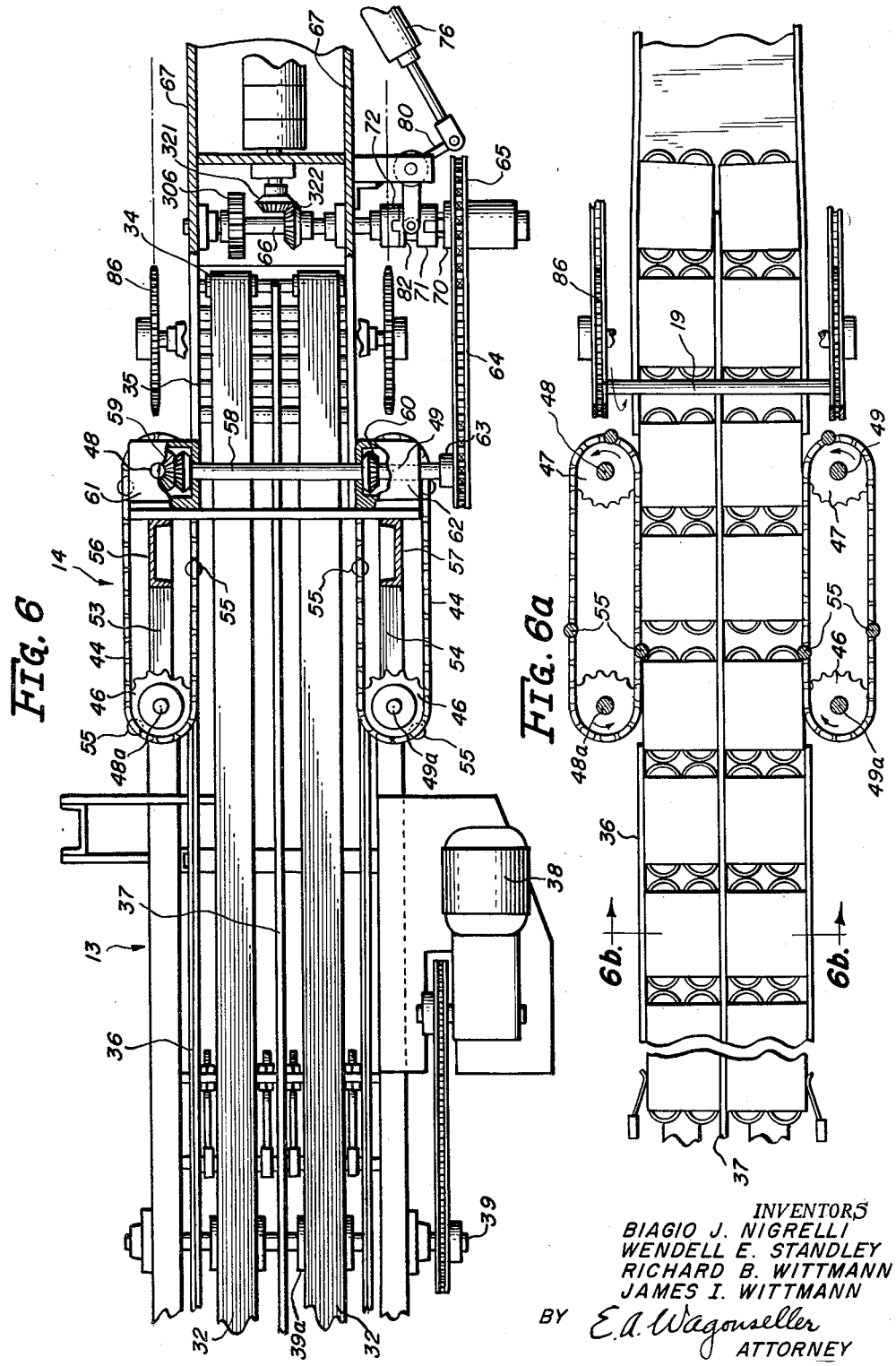

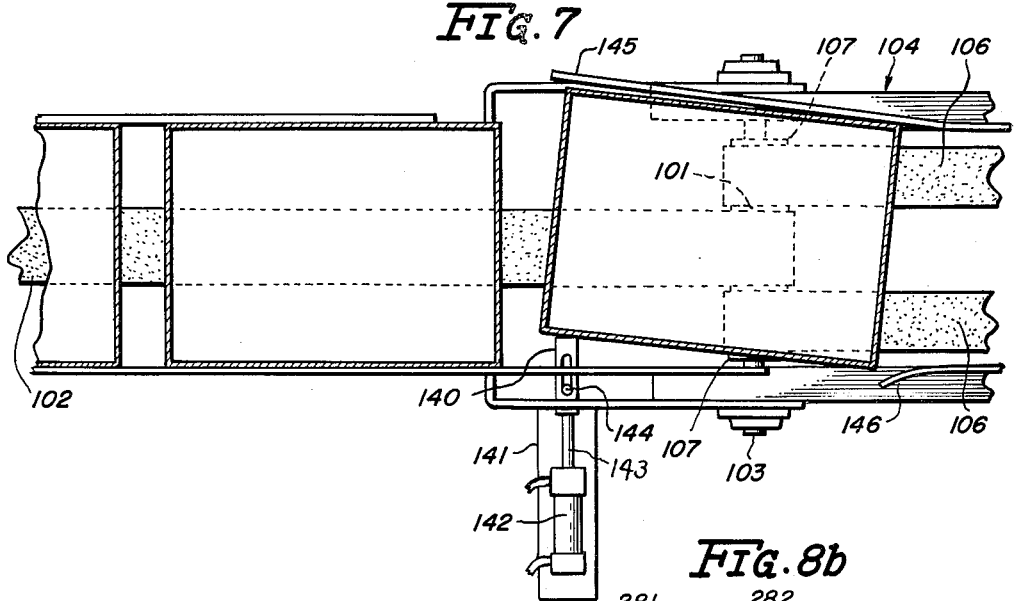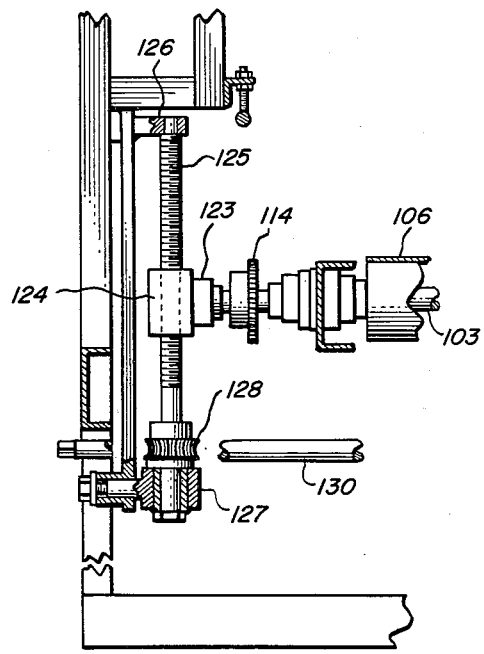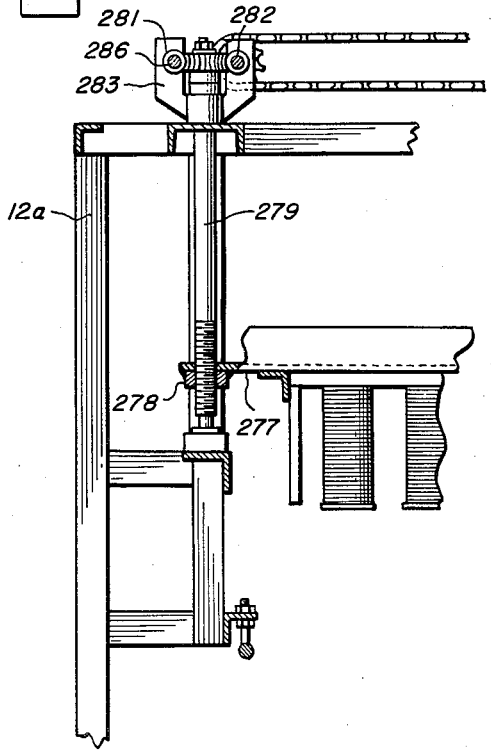

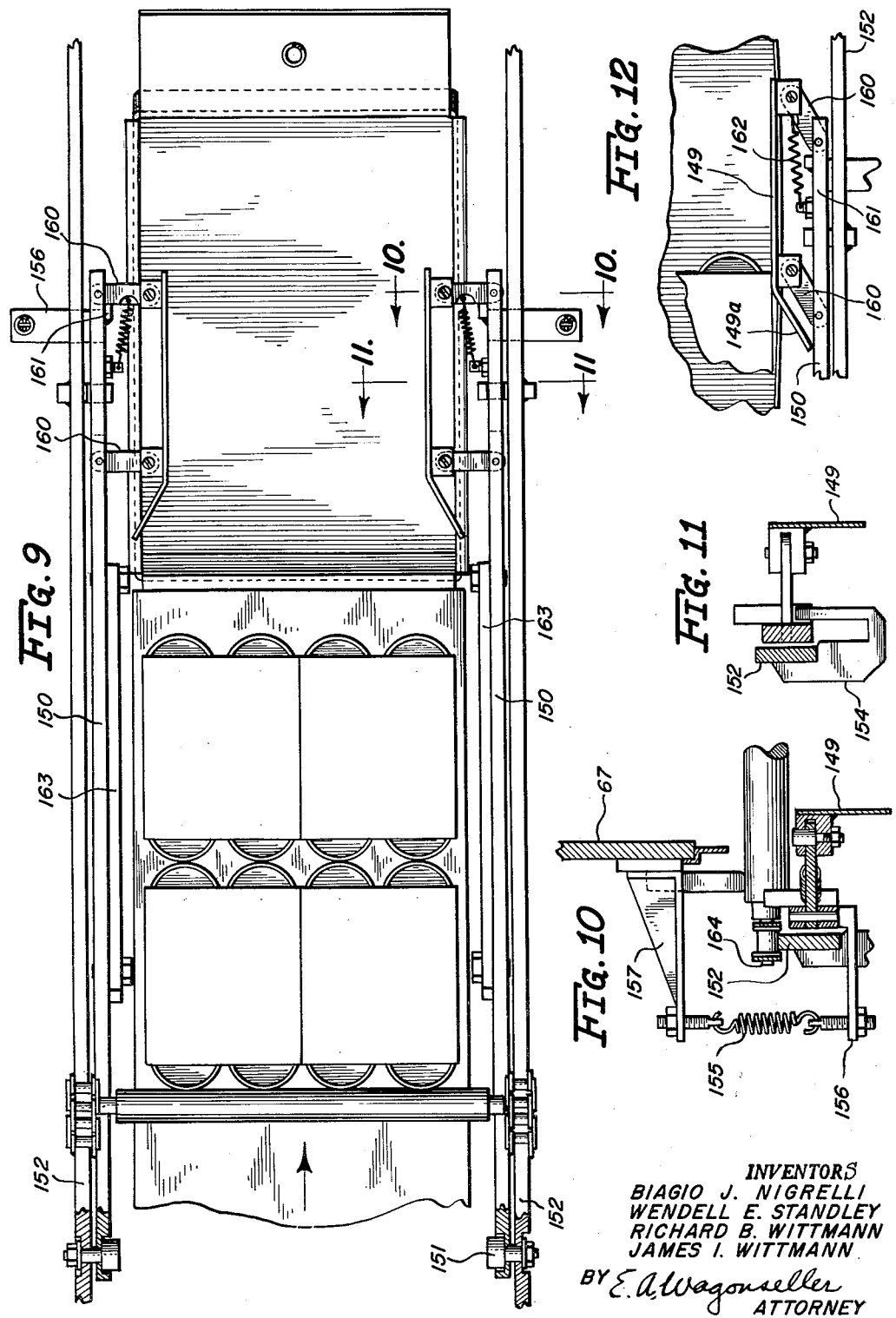

Sept. 11, 1962     B. J. NIGRELLI ETAL     3,053,025
CASE LOADER

Filed Feb. 29, 1960     12 Sheets-Sheet 9

INVENTORS
BIAGIO J. NIGRELLI
WENDELL E. STANDLEY
RICHARD B. WITTMANN
JAMES I. WITTMANN
BY E. A. Wagonseller
ATTORNEY INVENTORS
BIAGIO J. NIGRELLI
WENDELL E. STANDLEY
RICHARD B. WITTMANN
JAMES I. WITTMANN
BY E. A. Wagonseller
ATTORNEY Sept. 11, 1962     B. J. NIGRELLI ETAL     3,053,025
CASE LOADER
Filed Feb. 29, 1960     12 Sheets-Sheet 11
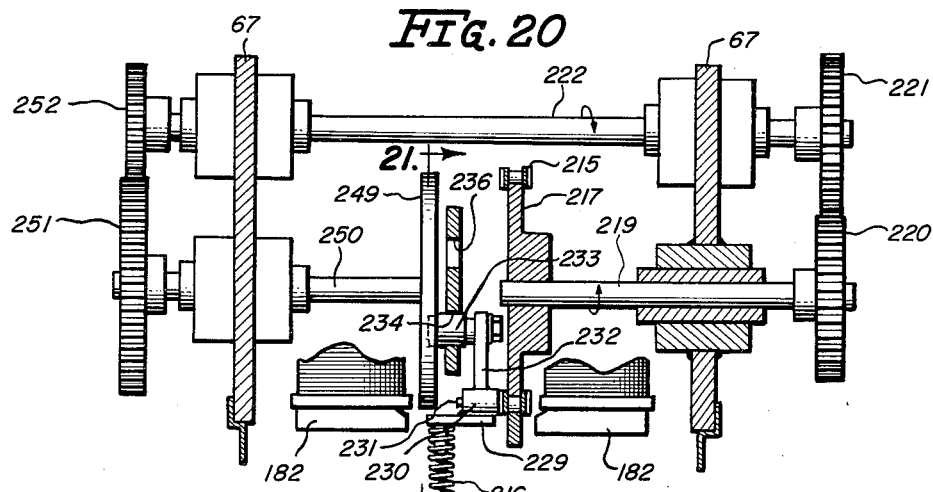
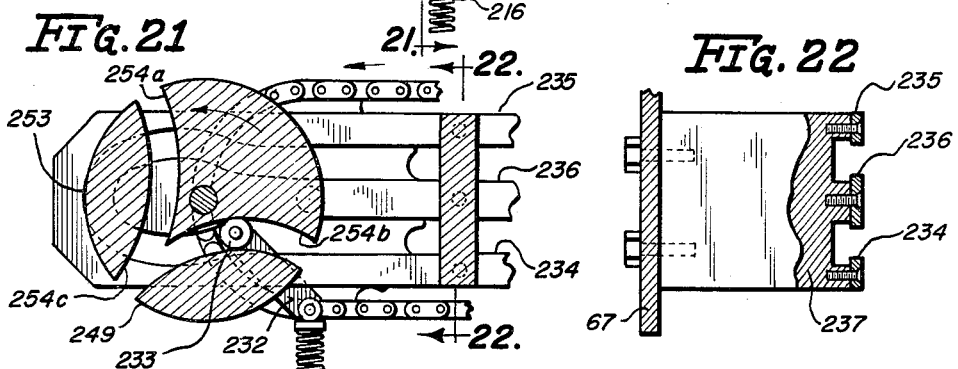
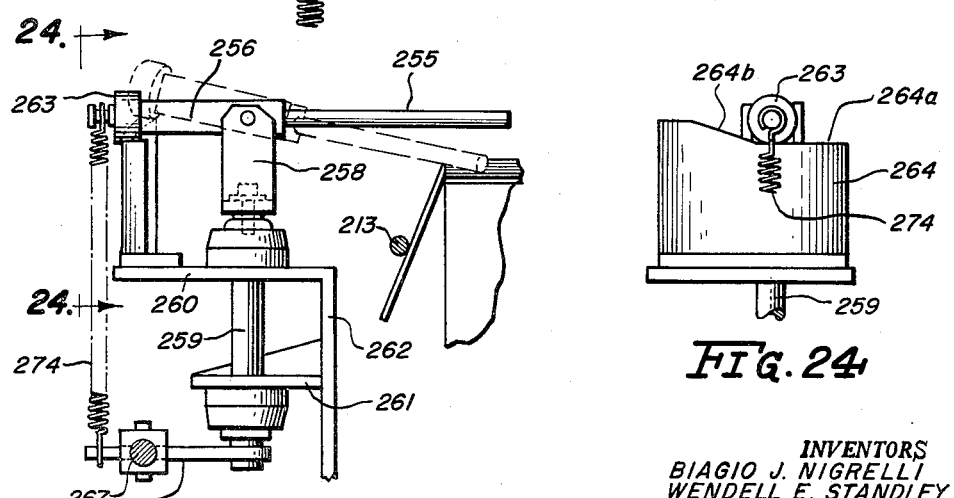
INVENTORS
BIAGIO J. NIGRELLI
WENDELL E. STANDLEY
RICHARD B. WITTMANN
JAMES I. WITTMANN
BY E. A. Wagonseller
ATTORNEY

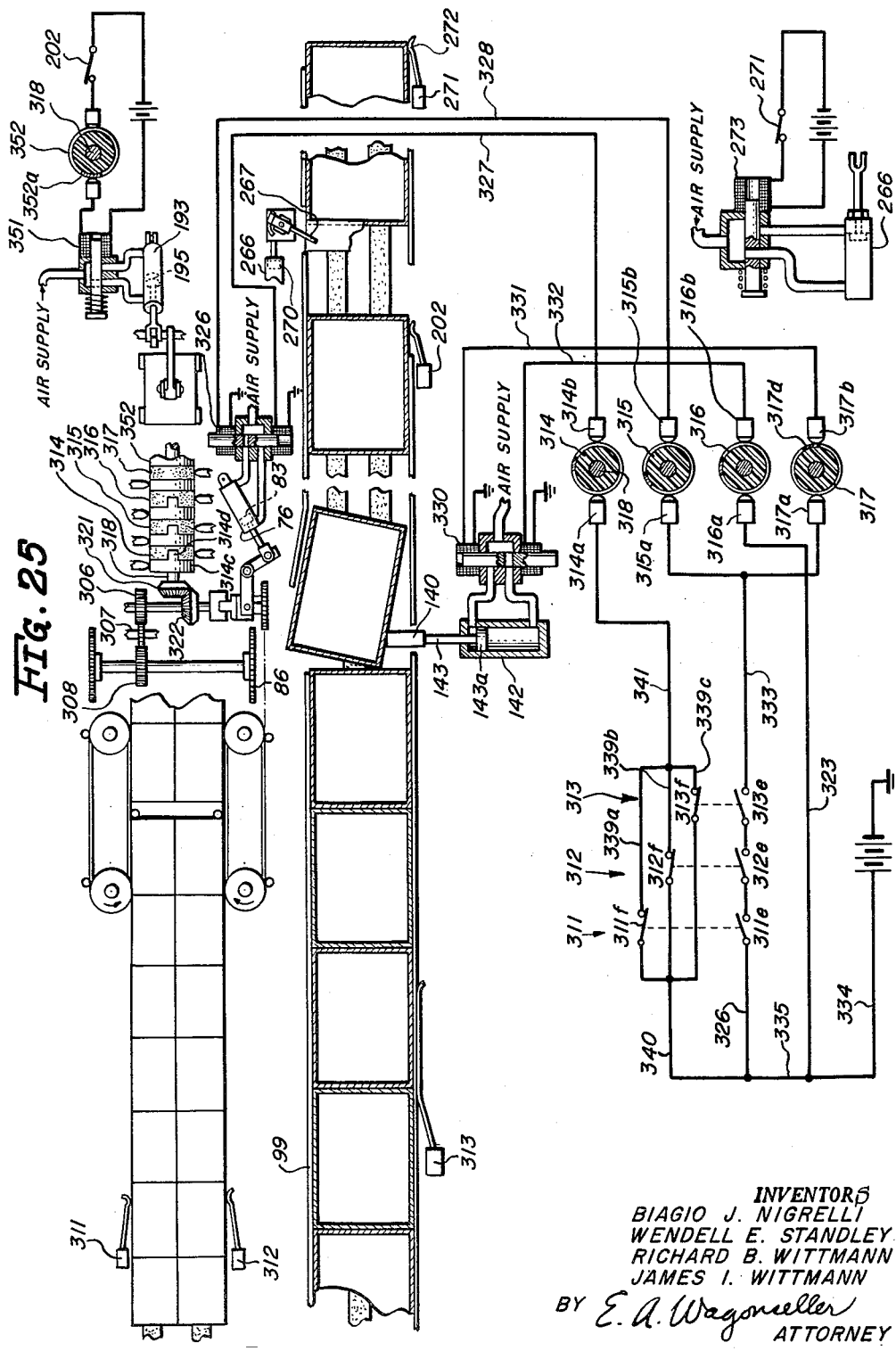

United States Patent Office 3,053,025
Patented Sept. 11, 1962

3,053,025
CASE LOADER
Biagio J. Nigrelli, Northbrook, Wendell E. Standley, Lake Forest, and Richard B. Wittmann and James I. Wittmann, Chicago, Ill., asignors to Ralph W. Johns, Biagio J. Nigrelli and Robert R. Johns, doing business as Johns-Nigrelli-Johns, Chicago, Ill., a co-partnership
Filed Feb. 29, 1960, Ser. No. 11,769
25 Claims. (Cl. 53—159)

The present invention relates to mechanism for loading shipping cases, either in the form of cases with closures or in the form of open trays, with a plurality of packages or articles, such packages or articles being loaded into the cases in groups or layers.

An important object of the invention is to provide efficient and rapid mechanism for the transfer of groups of articles from an article conveyor to cases on a case conveyor while both the articles and cases are travelling on their conveyors in substantially straight lines and both conveyors are in substantially constant operation.

Another object is to provide relatively simple and effective mechanism to enable two or more groups or layers of articles, coming from a line of conveyed articles, to be delivered successively into a plural layer case, either provided with closure flaps or in the form of an open top tray.

Another object of the invention is to provide a simple and efficient case loading mechanism for handling magnetically permeable articles, such as packages of filled cans, which can be employed to load either single layer or plural layer cases.

An additional object is to provide effectively operable guiding means for directing a group or layer of articles into cases, particularly cases made of corrugated or fibre board, in which the side walls of some of the cases to be loaded may be bowed inward or otherwise accidentally distorted in such a way that unguided article layers might come into contact with the upper edges of the walls with the result that cases would be damaged.

A further object of the invention is to provide efficient spacer or segregating mechanism for separating groups of articles on a conveyor during continuous operation, and at the same time assuring that each separated group will contain the proper, predetermined number of articles.

A further object of the invention is to provide a front flap hold-down mechanism for cases with closure flaps, such hold-down mechanism being contained in the restricted space between the poles of the magnets in the magnetic conveyor section.

A still further object of the invention is to provide mechanism adapted alternatively to load single layer or plural layer cases with a simple and easily effected rearrangement of conveying mechanism.

Still another object of the invention is to provide an effective system or arrangement for accurately timing the delivery of cases to the loading station with the conveying means for bringing the article groups into their loading position and, in the event of stoppage due to lack of cases or deficiency in the supply of articles to be loaded, subsequent resumption of the operation will be controlled so that accurate timing is maintained.

Additional and more specific objects and advantages of the invention will become apparent as the description proceeds.

Figure 1:
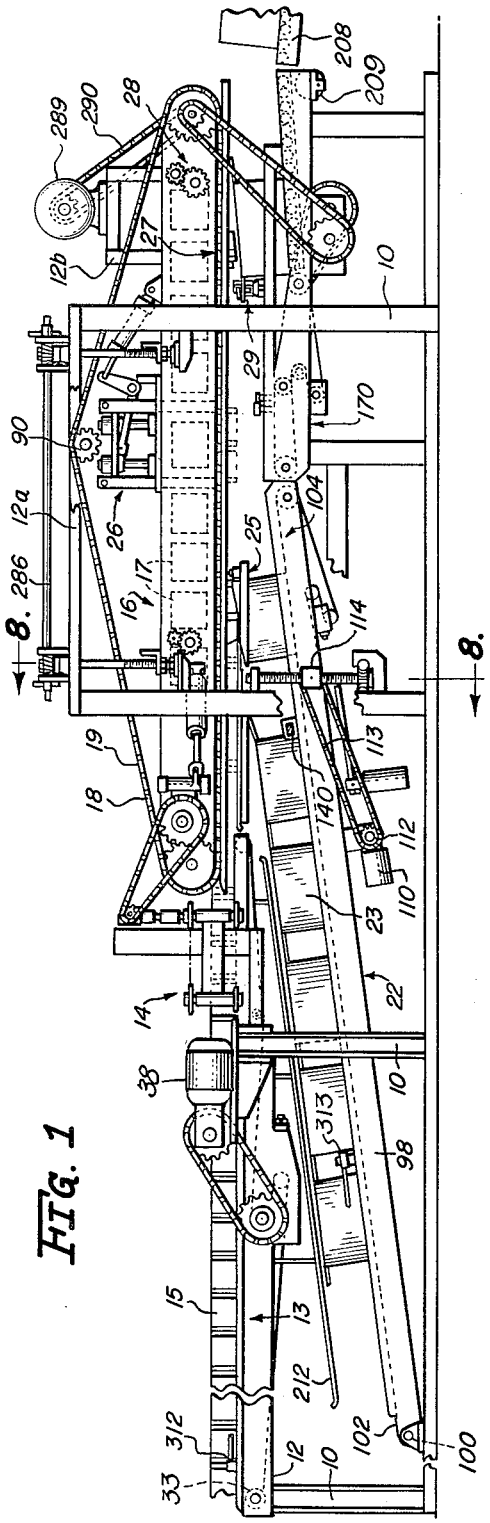
FIG. 1 is a side elevational view, somewhat schematic, showing the machine adjusted to load cases with two layers of articles.
Figure 3:
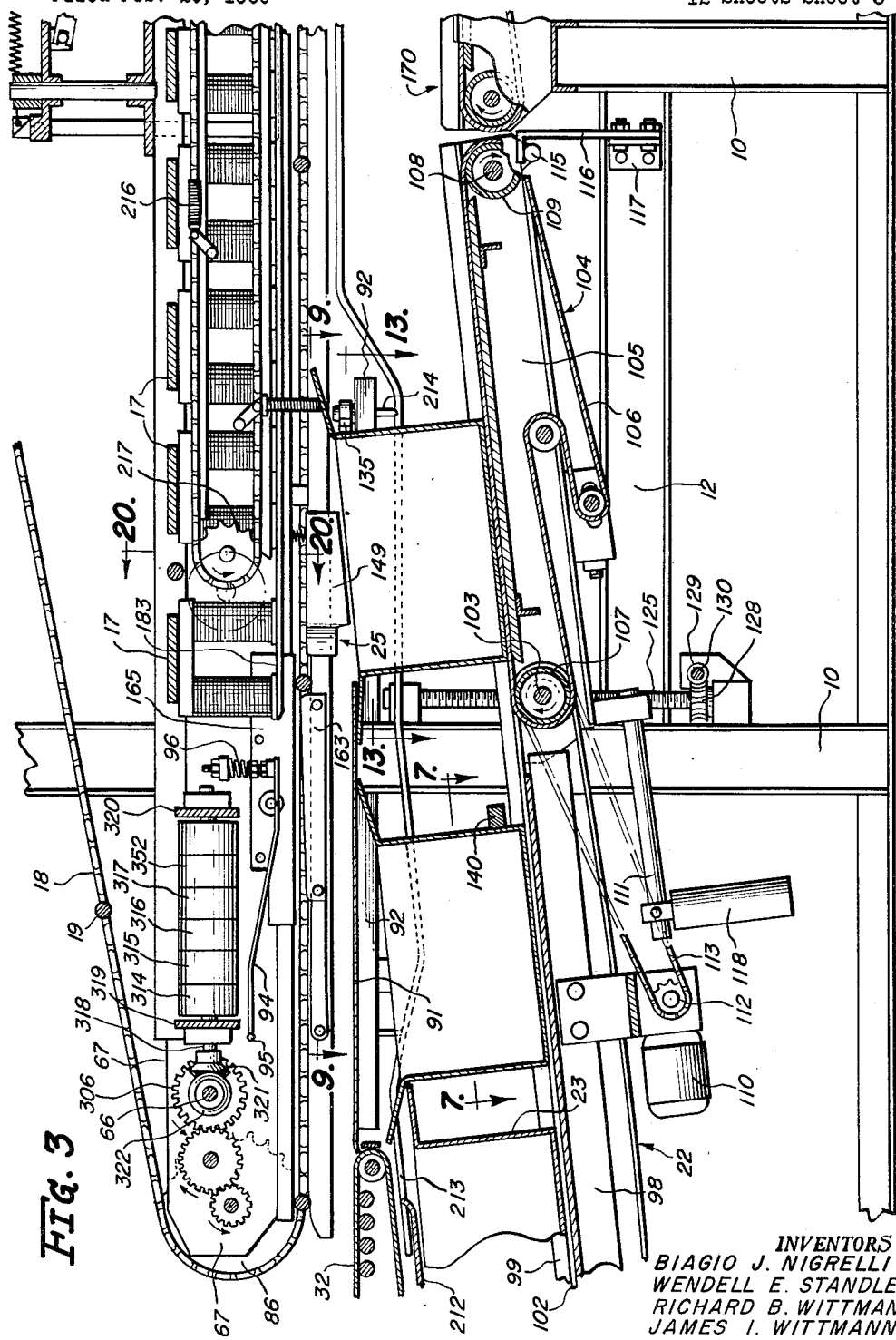
Figure 4:
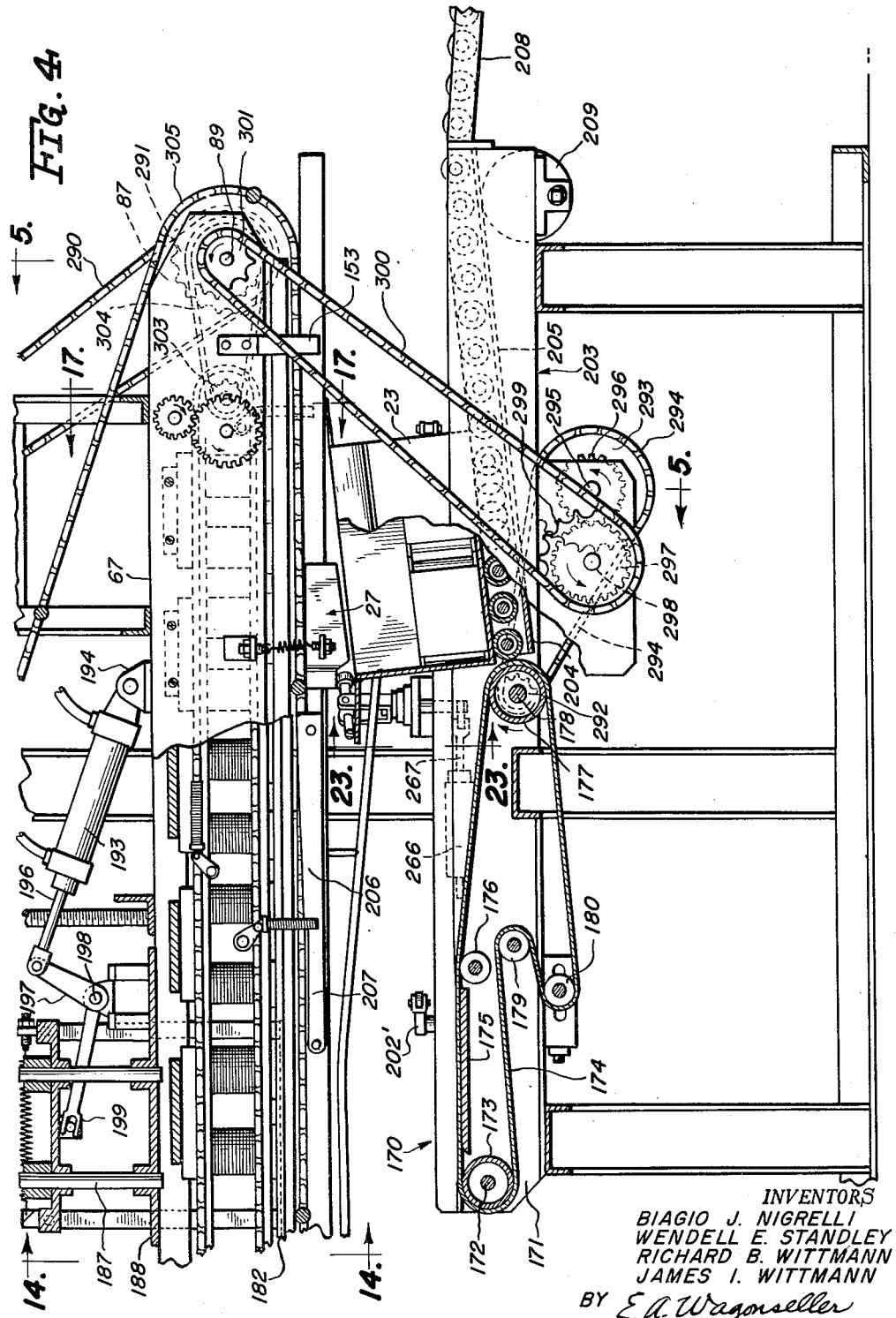
Figure 5:
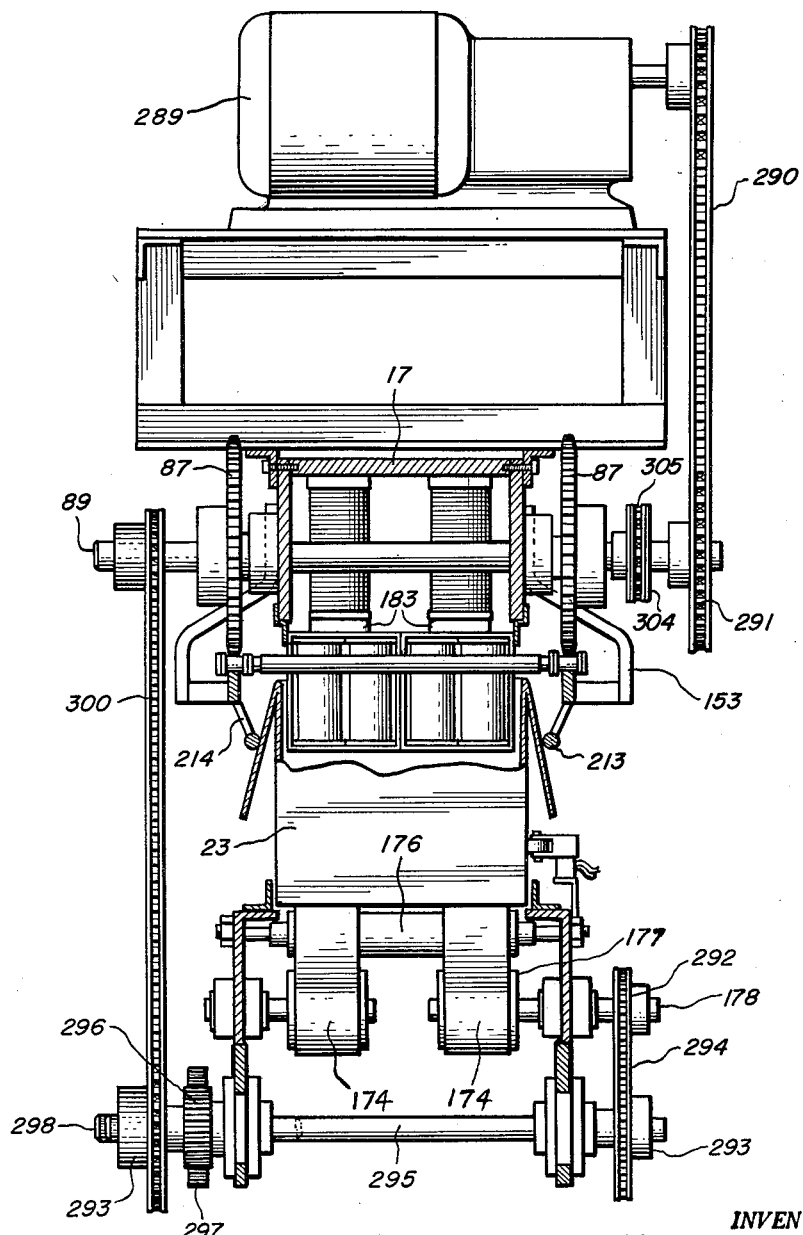
Figure 14:
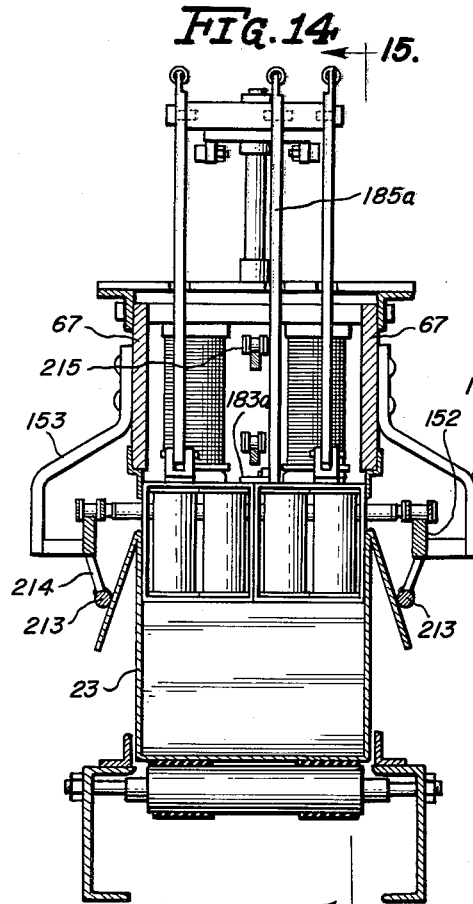
Figure 15:
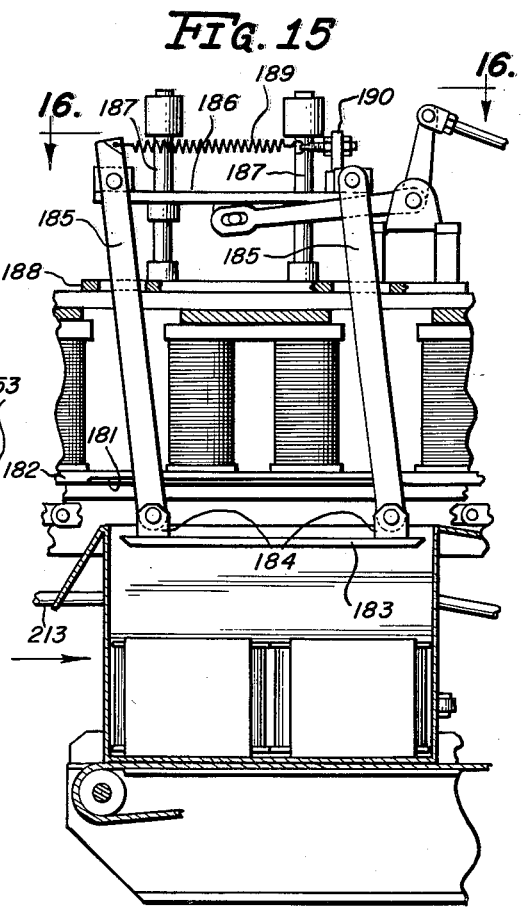
Figure 13:
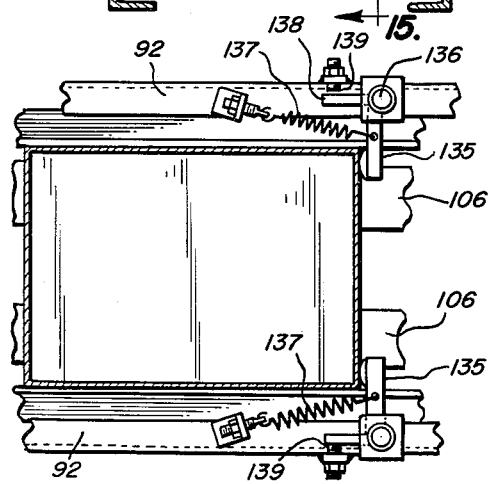
Figure 16:
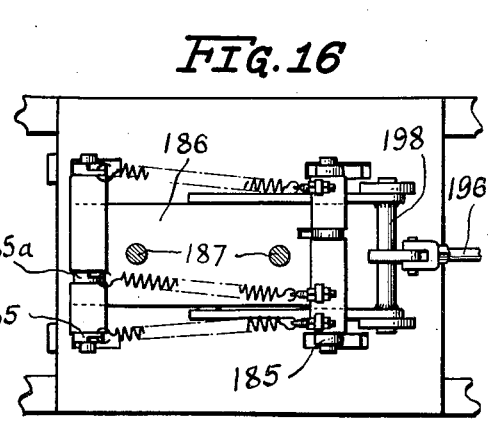
Figure 17:
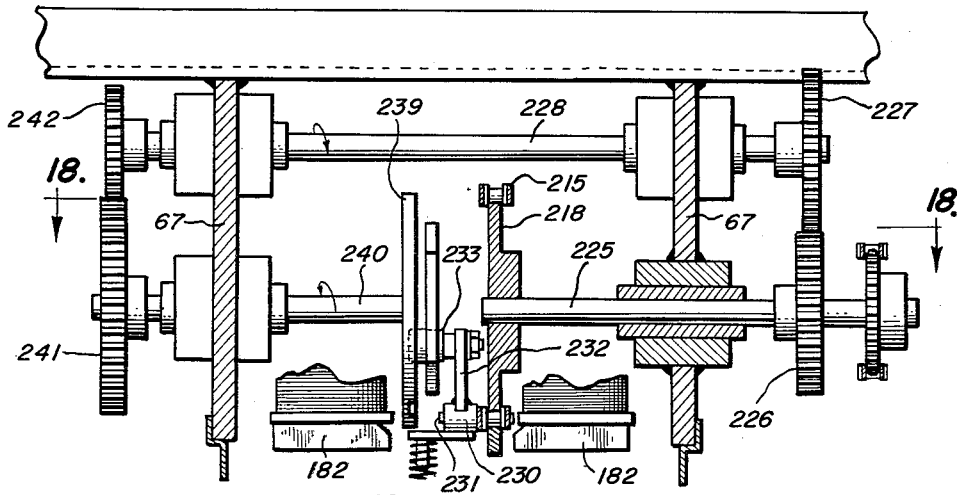
Figure 18:
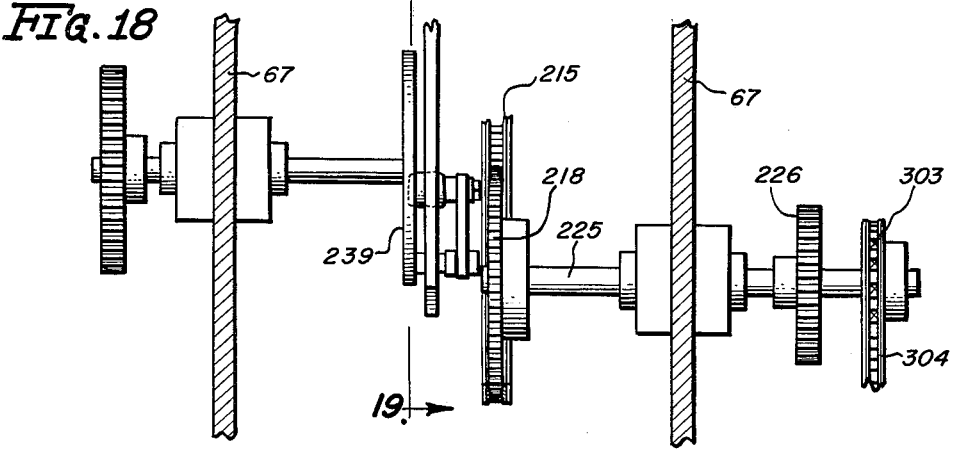
Figure 19:
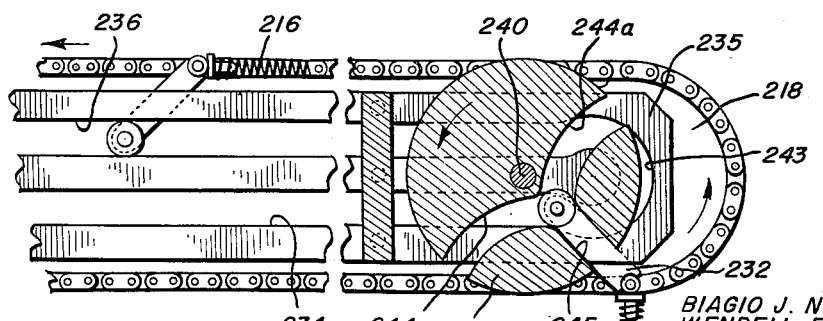

FIGS. 2, 3 and 4 are fragmentary, enlarged, side elevational views which, taken together, are similar to FIG. 1 showing, respectively, the separator mechanism for separating groups of articles of a size to be loaded into a case; the first case loading station with guide means for guiding an article group into a case; and the stripper mechanism for completing loading the first or lower article layer into a two-layer case together with the second loading station with guide means for the second article layer;

FIG. 5 is a cross-sectional view taken along line 5—5 of FIG. 4, looking in the direction of the arrows, showing the end of an article group as it is propelled along the under surfaces of the magnets and just before the top layer is released into the case;

FIG. 6 is a fragmentary plan view, partly in section, taken along line 6—6 of FIG. 2 showing group separator mechanism and drive therefor, including clutch actuating means;

FIG. 6a is a fragmentary plan view showing an article group just being released from the spacer and showing the preceding group about to be engaged by the pusher means to carry the group along the magnetic conveyor;

FIG. 6b is a view in cross-section taken along line 6b—6b of FIG. 6a showing two can packages on the conveyor belts and supported by side and center guide bars;

FIG. 7 is a fragmentary view in horizontal section, taken along line 7—7 of FIG. 3 to show the positive case stop;

FIG. 8a is a fragmentary detail view in vertical section, taken along line 8—8 of FIG. 1 below the article conveyor to show means for adjusting the case conveyor to various heights;

FIG. 8b is a fragmentary detail view in vertical section, taken along line 8—8 of FIG. 1 above the article conveyor to show the means for adjusting the magnet section up and down;

FIG. 9 is a fragmentary plan view, partly in section, taken along line 9—9 of FIG. 3, showing a case in initial loading position and an article group about to be advanced between the guides positioned over the case;

FIG. 10 is a fragmentary detail view, partly in section, taken along line 10—10 of FIG. 9, showing the arrangement by which the pivoted arm holding the article guiding means is depressed by the pusher rods for advancing the article groups;

FIG. 11 is a fragmentary detail view, partly in section, taken on line 11—11 of FIG. 9;

FIG. 12 is a fragmentary detail plan view showing how the article in moving against the guide tends to swing it forwardly and outwardly, causing the guide, in its lowered position, to bear against the case side wall;

FIG. 13 is a fragmentary plan view taken partly in section along line 13—13 of FIG. 3 showing a case at rest at the first loading station;

FIG. 14 is a fragmentary, vertical sectional view taken along line 14—14 of FIG. 4 looking in the direction of the arrows and showing the stripper mechanism in fully raised position;

FIG. 15 is a fragmentary, vertical sectional view taken along line 15—15 of FIG. 14, showing the stripper bars in a partially lowered position;

FIG. 16 is a fragmentary, top plan view, partly in section, taken along line 16—16 of FIG. 15, showing the stripper mechanism from above;

FIG. 17 is a partial, vertical sectional view on an enlarged scale taken on line 17—17 of FIG. 4, looking in the direction of the arrows, showing details of the discharge end of the front flap hold-down mechanism;

FIG. 18 is a horizontal sectional view taken on line 18—18 of FIG. 17;

FIG. 19 is a fragmentary sectional view taken on line 19—19 of FIG. 18, showing the cam guiding means for the hold-down fingers;

FIG. 20 is a partial, vertical sectional view on an enlarged scale taken on line 20—20 of FIG. 3, looking in the direction of the arrows, showing details of the rear end of the flap hold-down mechanism;

FIG. 21 is a detail sectional view, taken on line 21—21 of FIG. 20, showing the rear end of the cam guiding means;

FIG. 22 is a detail sectional view of the cam guide plate taken on line 22—22 of FIG. 21;

FIG. 23 is a detail view, partly in section, taken on line 23—23 of FIG. 4, showing the rear flap depressing mechanism at the second loading station;

FIG. 24 is a fragmentary detail view of the cam for the flap depressing mechanism, as viewed from the left side of FIG. 23 as it appears in the drawing; and FIG. 25 is a schematic plan view showing actuating means for various parts with control switches therefor and a wiring diagram.

The mechanism of the present invention, as herein disclosed, is particularly applicable to the loading of rectangular cases with packages of cans. The can packages may vary in size and number of cans but in the present instance the packages are represented as containing six cans in two rows of three, held in tubular cartons somewhat shorter than the can rows so that the end cans project outside the open ends. The packages, in effect, thus have rounded corners. As the invention is applicable to loading cases with other objects or articles as well as packages the term "articles" will, for convenience, generally be employed in the description which follows.

The mechanism disclosed has a case loading station to which cases are delivered on a conveyor. The case is brought into position against a yieldable stop that holds the case while the conveyor continues its advancing movement. The stop is designed to hold the case while empty but may be displaced to allow the case to advance when greater force is exerted against the stop. The groups of articles are brought to the loading station on an overhead magnetic conveyor which is disposed at a small angular relationship to the case conveyor so that the article group first enters the upper part of the case adjacent the leading wall. As soon as the leading face of the article group engages the inside of the case front wall the case is forced past the yieldable stop.

The article group is propelled by an endless chain member having pusher rods which transfer the groups from a feeding conveyor to the magnetic section. As the pusher rods propel the article group toward the waiting case, the article group moves in between a pair of vertically disposed guide plates held near the ends of pivoted arms. Mechanism timed with the advancing movement of the article group causes the arms to swing down to bring the lower ends of the guide plates inside the case along the side walls and thus assure smooth entrance of the article group into the case without likelihood of the bottom surface of the group contacting the upper edges of the side walls.

The articles are arranged in groups on a feeding conveyor having belts on which the articles are assembled in two rows in end-to-end abutted relation. The belts are operated at a constant speed to bring the articles to a spacer mechanism located intermediate the ends of the feeding conveyor. This spacer mechanism operates at a speed slower than the feeding conveyor. When the speed of the articles is retarded by the spacer, the belts slip beneath the articles without damage either to the articles or the belts. As each group is released from the spacer it is moved at the normal belt speed and thus advances faster than the group controlled by the spacer mechanism to create a space to admit one of the pusher rods which propel the groups to the cases.

In the loading of two-layer cases, after the first article group has been inserted part way into the case, the guides which assisted the first group to enter the upper part of the case are raised to clear the rear wall and the pusher rods, still engaging the articles, move the case to a conveyor section where a rapid acting stripper mechanism applies sudden downward pressure on the article group to detach the group from the magnets and force the articles uniformly into the case. The case, now containing its lower layer, is carried to the second loading station just ahead of the succeeding article group. At this loading station the case is stopped for a short interval and held at an inclination to the magnetic conveyor on a section of anti-friction rolls until the succeeding group enters the top portion of the case and again causes the case to advance by forward pressure of the leading edge of the group against the front wall. The second loading station has guide elements similar to the guides at the first loading station to facilitate entry of the article group. As the case then advances, with the article group partly inserted into the case and still held suspended by the magnetic conveyor, it arrives at the discharge end of the loading mechanism. When the case passes the last magnet unit the articles are allowed to drop into the case which then, having received its full load, is conducted to the next treatment or handling station on the independent conveying means.

When the machine is to be employed to load single layer cases, the case conveyor is suitably adjusted into a higher position, so that when the leading wall of the case is against the yieldable stops the case will be in proper position for entry of the article group. An auxiliary conveyor section is arranged to extend from the discharge end of the first conveyor section at a downward inclination to the discharge end of the machine thus bridging over the second loading station. The stripper mechanism will be rendered inactive and current will be disconnected from all the magnet units beyond the end of the first conveyor section. Thus, as the articles pass the last energized magnet unit, they will be allowed to drop into the case which then moves onto the auxiliary, downwardly inclined conveyor section and from this section onto the independent conveying means referred to above.

For cases having closure flaps on four sides, the trailing flap, extending rearward, is allowed to travel freely and the side flaps are plowed down by cam rails to keep them relatively close to the case side walls. The flap on the leading wall is held approximately in the plane of the top edges of the walls by a hold-down finger on a chain located between the poles of the magnets and passing over sprockets located at opposite ends of the magnetic conveyor. This hold-down finger has a portion which is guided between cam rails so that, on rearward travel of the hold-down finger, it will be retracted substantially within the contour described by travel of the chain and thus will remain clear of the upper portions of the magnets or other structure. The trailing closure flap for two-layer cases arriving at the second loading station is moved down if in position extending above the level of the case wall so that movement of the article group destined as the top layer will not be impeded by such trailing flap.

Figure 1A:
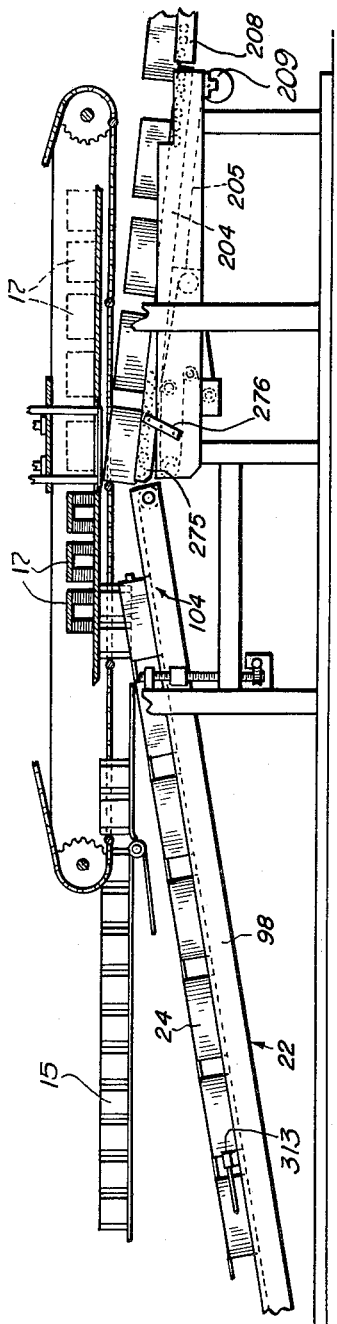
FIG. 1a is a view similar to FIG. 1, but with a number of parts omitted, and showing the machine adjusted to load single layer cases or trays.

As best shown in FIGS. 1 and 1a of the drawings, the mechanism is supported on a plurality of vertical, transverse and longitudinal frame members designated at 10, 10, 11, 11 and 12, 12. On these frame members there are suitably supported a feeding conveyor 13 combined with a spacer mechanism indicated as a whole at 14. The feeding conveyor is arranged to deliver groups of can packages 15, for convenience referred to as articles, to an overhead magnetic conveyor, indicated as a whole at 16, comprising a group of magnets 17 and a chain conveyor 18 having pusher rods 19 to move the article groups along on the downwardly facing poles of the magnets.

A case conveyor 22 is suitably supported on the frame structure below the article conveyor and is adapted to deliver open top cases, either single or double layer, and with or without hinged top flaps, to a loading station where the case will be held temporarily to receive the article group. Cases for two layers are indicated at 23 and cases for single layers are indicated at 24.

The article group is conveyed between guide elements, indicated as a whole at 25 which facilitate partial entry of the group into a case. The magnetic conveyor, propelling both the articles and the case, serves to carry the articles beneath a stripper mechanism, indicated as a whole at 26, which is designed to push the first group forcibly down into a case. This stripper mechanism is intended primarily for two-layer cases.

An additional loading station is located beyond the stripper and includes guide mechanism indicated at 27, which may be similar to the guide mechanism 25, for facilitating entry of the top layer into a two-layer case.

Located in the space between the magnet poles is a travelling flap hold-down mechanism, indicated as a whole at 28, arranged to hold the leading flap on cases provided with closures so that the forward edge of the flap will be kept from contact with the gripping surfaces of the magnets or other parts as the cases are advanced.

At the rear end of the second loading station a mechanism indicated at 29 serves to swing down any upwardly extending trailing wall flap so that such flap will not interfere with the oncoming article group.

The packages for which the present mechanism is particularly designed comprise six cans in two rows of three cans each, held in an open end paperboard carton of a length such that the end cans of each row project partially out from the ends of the carton. The cartons are filled by loading mechanism, not shown, and are conveyed along two adjacent paths whereby the packages or articles may conveniently be arranged in groups of four.

*Feeding Conveyor and Article Separator*

The feeding conveyor 13 as herein shown comprises a pair of endless belts 32, 32 passing over rear and front rollers 33 and 34 mounted on shafts journalled in side frame members 35, 35. Side guide bars 36, 36 and center guide bar 37 serve to keep the articles in line. The belts are preferably driven by a motor 38 mounted on the conveyor frame and connected by a chain and sprocket drive with a shaft 39, journalled in the frame members 35 and carrying pulleys 39a, 39a forming part of a belt tightener mechanism 40. The front belt rollers 34 are preferably of reduced diameter in the interests of compactness of arrangement. The upper reach of each belt 32 is preferably supoprted on a plurality of freely rotatable rollers 41, 41 journalled in the side frame members. The belts are preferably of a construction or texture permitting them to slip beneath the articles carried thereon without damage either to the belts or the articles. As will presently be brought out, the flow of articles to the loading station may be stopped at times due to lack of cases on the case conveyor or to a deficiency in the supply of articles. In such case the belts 32 will continue operating while the articles supported thereon are prevented from advancing.

The article spacer 14 is located near the discharge end of the feeding conveyor and is arranged to engage the abutted rows of articles on the feeding conveyor and retard the movement of the rows so they will move at a speed somewhat less than the normal speed of the belts 32. Thus, a group of articles released by the spacer near the discharge end of the belts will be speeded up and will draw away from the next succeeding group engaged by the spacer. As shown in FIGS. 2 and 6, the spacer comprises two identical sets of driven chains 44, 45, one set being located at each side of the feeding conveyor. The chains 44 and 45 are carried on upper and lower sprockets 46, 46 and 47, 47, secured on vertical shafts 48, 48a and 49, 49a. These shafts are journalled intermediate their ends in bearings 51 and 52, which are carried on frame pieces 53 and 54, located on opposite sides of the conveyor and supported on the conveyor frame. The chains 44 and 45 carry vertically extending, article engaging rods 55, 55 attached at opposite ends to the upper and lower chains. In the present instance there are three vertical rods on each set of chains, spaced apart a distance equal to the length of the article groups being separated. Advantage is taken of the shapes of the articles or packages which, due to the projecting end cans, cause the packages to have rounded vertical corners. The vertical spacing rods are adapted to enter partially in the space between the corners of the adjacent packages and thus sufficient contact is provided to prevent the package or article group from passing out of contact with the rods until such rods begin to move outward around the leading end sprockets 46 and 47.

The spacer mechanism, as above indicated, is adapted to be driven at a linear speed somewhat less than the linear speed of the feeding conveyor belts and the drive is controlled so that it may be stopped automatically in the event of a lack of sufficient articles on the feeding conveyor or lack of a sufficient supply of cases on the case conveyor. Each frame piece 53 and 54 supports an upright channel frame member 56 and 57 to which are secured gear boxes 61 and 62 in which the end portions of a horizontal shaft 58 are journalled. At one end shaft 58 carries a bevel gear 59 meshing with a similar bevel gear on vertical shaft 48. The shaft 58 also carries near its other end, within the gear box 62, a bevel gear 60 meshing with a similar gear on vertical shaft 49. A sprocket 63 is fixed on the end of shaft 58 adjacent gear box 62. This sprocket is driven by a sprocket chain 64 which in turn passes over a sprocket 65 arranged to turn freely on a shaft 66 journalled in longitudinal frame plates 67, 67. During operation of the loading mechanism shaft 66 will be in constant operation, driven by gearing which will be described below.

The sprocket 65 is mounted to rotate with a clutch part 70 maintained in constant rotating relation with a second clutch part 71, slidable on the shaft 66 and adapted to turn freely thereon. The part 71 is kept in rotating relation with part 70 by a rib and slot connection. A third clutch part 72 is keyed to the shaft 66 and has a slot into which a rib on part 71 is adapted to be received when the part 71 is moved toward the part 72. By sliding part 71 one way or the other while shaft 66 is rotating, the clutch may be engaged or disengaged to drive the chain and sprocket or allow it to remain at rest.

Power means is provided for engaging and disengaging the clutch to control operation of the chain and sprocket drive for the article spacer 14. This comprises a cylinder and piston mechanism operable by compressed air. The cylinder 76 has its closed end pivoted on a bracket 77 on the machine frame and the piston rod 79 has its outer end connected to one arm of a bell crank lever 80 the other arm of which comprises a yoke 81 having pins received into an annular groove 82 in the clutch element 71. Admission of compressed air into the cylinder on the appropriate sides of piston 83 will engage and disengage the clutch, to start and stop the spacer mechanism. The valve means for actuation of the piston and control of such valve will be explained later.

*Magnetic Conveyor*

In the normal operation of the feeding conveyor there will be a constant supply of articles in each row. The articles will be in abutted relation and will be advancing at the speed of the spacer mechanism as the feeding conveyor urges the abutted rows against the article engaging rods 55 of the spacer. As soon as the forward spacer rods begin to move around their sprockets the group between the spacer chains begins to advance at the speed of the feeding conveyor belts and, by the time the trailing edge of the released group reaches the end of the belts, there will be a space created sufficient to receive one of the pusher rods 19 on the chain conveyor 18. This chain conveyor comprises a pair of spaced sprocket chains passing over rear sprockets 86, 86 and forward sprockets 87, 87 carried on shafts 88 and 89 respectively, journalled in bearings carried in longitudinal frame members 67, 67 supported on the main frame. The return portions of the chains 18, 18 pass over elevated supporting sprockets 90, 90 carried on a longitudinal frame piece 12a. The advancing portion of the chain conveyor 18 carries the pusher rods on a level somewhat above the level of the discharge end of the feeding conveyor so that the rods will come into contact with the article group between its upper and lower surfaces.

As the article groups leave the feeding conveyor, propelled by the pusher rods, the groups first move along a dead plate 91 aligned with the conveyor and secured on a frame section 92 which is aligned with the frame 35 of the feeding conveyor. Before the articles leave the dead plate they become engaged by the first unit of a series of electromagnets 17, 17 secured in position on the frame members 67. The entire article group is then transferred progressively from the dead plate to the downwardly directed faces of the magnets.

For can packages of paperboard having central, upstanding handle panels, means are provided for folding the handles over to lie flat on the top wall of the carton. For this purpose two folding plows 94, 94 are secured to the frame members in position to engage the handles of the two rows of advancing packages and progressively fold such handles over as the packages advance along the dead plate. The rear ends of the plows are pivoted at 95 and the forward ends are held down yieldingly by springs indicated at 96, 96.

Case Conveyor and First Loading Station

The mechanism herein disclosed is adapted to load two-layer or single-layer cases with closure flaps as well as two-layer or single-layer open top trays. The loading of two-layer cases will be described first. The case conveyor 22 may be of any convenient length and is located beneath the article conveyor.

As shown in FIGS. 1 and 3, the case conveyor comprises a movable frame section 98 having side members 99, 99, to guide the cases. At opposite ends of the frame 98 are rollers 100 and 101 over which extends an endless belt 102. The roller 101 is carried on a shaft 103 (see FIGS. 3 and 7) which serves as a pivotal axis for a companion conveyor section 104 which is hingedly connected with the seection 98. The seection 104 has side frame members 105, 105 and belts 106, 106 passing over rollers 107, 107 on shaft 103 on opposite sides of the roller 101. At the forward end of the conveyor section 104 is a shaft 108 carrying a roller 109 over which run the belts 106, 106.

The shaft 103 is driven by a motor 110 supported on the conveyor frame members 98. A sprocket 112 on the motor shaft has a chain 113 passing thereover which extends in turn over a sprocket 114 on shaft 103. See FIGS. 3 and 8a.

The conveyor section 104 is capable of swinging vertically with respect to section 98 about shaft 103. The right hand end of the section 104, as viewed in FIG. 3, is free to swing down. This is advantageous in the event a case should become jammed and facilitates its easy removal. This section 104 is preferably counterweighted by weights 118 supported on the rearwardly extending bars 111. A rod 115 is secured on the frame 105 of conveyor 104 and has laterally projecting end portions which extend beneath suitable retaining members 116 adjustably supported at 117 on horizontal frame member 12.

Means are also provided for raising and lowering the conveyor section bodily. For this purpose the ends of shaft 103 are journalled in movable bearings 123 each having a threaded tubular portion 124 to receive a threaded, vertically extending rod 125 rotatable in upper and lower bearings 126 and 127. Worm wheels 128, 128 are keyed to the lower portions of the rods 125, and mesh with worm gears 129, 129 fixed on a horizontally extending shaft 130 formed with a square end arranged to be rotated by a suitable crank. Rotation of the shaft turns both worm wheels thus raising the bearings 124, 124 to adjust the connected ends of conveyor sections 98 and 104 to desired heights.

When the mechanism is to be utilized to load two-layer cases the conveyor sections 98 and 104 are preferably arranged approximately in alignment and upwardly inclined as shown in FIGS. 1 and 3. The height of adjustment of the conveyor section 104 will be determined by the height of cases to be loaded. As illustrated, a two-layer case will be held on conveyor section 104 at such height that the leading face of an advancing article group will enter the leading portion of the case and move against its front wall. In so doing, the case is advanced and the article group is inserted into the upper portion of the case.

The belts of conveyor sections 98 and 104 are preferably operated constantly while the mechanism is in use, and such belts are designed to slip beneath cases temporarily held stationary without damage either to cases or the belts.

The case ready to receive its load at the loading station is preferably held yieldably until an article group is introduced. For this purpose there are provided on the forward ends of the frame pieces 92, 92 a pair of fingers 135, 135 (see FIGS. 3 and 13) pivoted at 136, 136 and having their free ends extending horizontally inward into the path of the case. Coil springs 137, 137 each have one end connected to a finger and their other ends secured to a bracket on the frame piece 92. A rearwardly extending piece 138 on each finger is arranged to abut against an adjustable stop 139 to limit the rearward movement of the finger. The empty case, moving forward against the stop fingers, will come to rest as the strength of the coil springs is sufficient to hold the case with the belts continuing to travel thereunder. The fingers can be displaced to allow the case to pass when the group of articles has moved partially into the case to bear forcefully against the leading case wall. After a case has been carried past the yieldable stops they return to their original position ready to stop the next empty case.

Means are provided for releasing cases one at a time for movement to the loading station. For this purpose a positive stop element 140 (see FIGS. 1 and 7) is located a short distance to the rear of the loading station. A bracket 141 extending outwardly of the conveyor has a piston and cylinder mechanism 142 secured thereon, the stop 140 is carried on the end of piston rod 143 and is in the form of a narrow finger or block having a slot to receive a stationary pin 144 to restrict and guide the movement of the stop element. The case guide bar at the side of the conveyor opposite the stop is flared outward at 145 to allow a case to be pushed laterally to assume an angle with respect to the line of travel, and the guide bar on the side of the stop is interrupted for a short distance and has a small flare at 146 to assist in guiding a released case in its advance on the conveyor. The stop is controlled in time with the article conveyor to release a case by retraction of the stop. As the conveyor belts are continuously operating, as soon as the stop is retracted the case will advance. Before the case advances beyond the stop, the latter is again moved forward against the side of the released case. This moves the case at an angle as shown in FIG. 7 and the stop is thus in position to hold the next case while the released case, moved at an angle, continues to move past the stop, being brought back into the proper path by the guide bars. This case then moves on to the loading station where it comes to rest against the yieldable stops and stays there until an article group is inserted which will then move the case past the yieldable stops. For simplicity of illustration, FIG. 7 shows the use of the stop 140 with cases or trays without cover flaps. These cases will of course come into end-to-end contact, whereas cases with front and rear flaps will be separated a distance at least equal to a flap length as shown in FIGS. 1 and 3. In some instances the flaps on adjacent cases may be in edge-to-edge contact.

Article Loading Guides

The article groups, propelled by the pusher rods, pass along the dead plate 91, and just before leaving the plate, the articles are engaged by the first magnet unit 17 and will be moved along the magnets to the loading station. As each article group is being inserted into the top of the case at the loading station, the group will first move in between the guide elements which have entered the case well inside the side walls. As shown in FIGS. 3 and 9, the guiding mechanism, indicated as a whole at 25, comprises a pair of downwardly and laterally movable plate elements 149, 149 located in a position intermediate the ends of the case held at the loading station. For the purpose of enabling the plates 149 to be lowered they are preferably mounted on a swingable frame comprising arms 150, 150, pivoted at 151 on side frame rails 152, 152, suspended from frame plates 67, 67 on brackets 153, 153, see FIGS. 4, 5 and 14. The arms may swing down a limited distance guided within U-shaped brackets 154, 154 secured on rails 152, 152, see FIG. 11. Each of the arms is spring loaded to move upward by means of a coil spring 155 which, at its lower end is secured to the arm through a bracket 156. This spring 155 is secured at its upper end to a bracket 157 attached to side frame member 67.

Each plate element 149 is pivotally supported on its arm 150 by equi-length links 160, 160 pivoted to the arm and to the rear face of the plate to provide a parallelogram arrangement whereby the plates remain in parallelism with the arms and consequently with the case side walls. The links are limited in their rearward swinging movement by a stop block 161 on the arm 150 against which the forward link may bear. A spring 162 secured at one end to the arm 150 and at its other end to the forward link, urges the link against the stop 161 and holds the plate 149 in its farthest inward position. The rear portions of the plates are flared outward at 149a to facilitate entry of the article group between the plates.

Downward movement of the guide plates is timed with the advance of the article group so that just before the group enters between the flared ends of the plates they will be moved down with their lower edge portions below the top edges of the side walls of a case at the loading station. For this purpose an elongated cam plate 163 is bolted to each arm 150, preferably on the inside surface of the arm, see FIGS. 3, 9 and 10. From its rear to front ends the cam plate slopes upward away from the arms 150. As shown in FIGS. 3 and 9, the cam plate is arranged to be contacted and depressed by the ends of the pusher rods 19 on the conveyor chains 18. The same pusher rod that propels the article group will engage the cams 163 and cause the guide plates to dip into the waiting case.

The conveyor chains ride along the upper edges of the rails 152, and extended spindles 164 on the pusher rods 19 are connected to the links of the chain. In order to prevent the pusher rods from being displaced upward by the cams 163, hold-down plates 165, 165 are secured on the side frame plates 67 above the cams. Thus, before the pusher rods contact the cams they pass beneath the plates 165, see FIG. 3, and hold the rods from upward movement. The plates 165 and cams 163 are preferably secured for easy adjustment forwardly or rearwardly on their supporting members.

As the pusher rods pass beyond the forward ends of the cams 163, the springs 155 on the arms 150 pull the arms back to raised position, thus lifting the guide plates so that the trailing wall of the case will move past the plates without hindrance. This manner of mounting the plates, so that they will move into the cases spaced well away from the inside surfaces of the side walls, has the advantage that the guide plates will enter the cases without interference even though the side walls might be inwardly warped or distorted. The plates will stay in lowered position as the leading edge of the article group reaches the flared portions of the plates. The article group in moving against these portions causes outward and forward movement of the plates, thus tending to make the plates press outward upon the side walls of the case as the article group advances and begins to enter the case due to its inclination relative to the path of movement of the article group.

When the group engages the case front wall the case will be propelled forward to displace the yieldable stops and immediately after the case begins to move past the stops, the guide plates are lifted from the case. Further movement of the case to the end of the conveyor section 104 causes the article group to continue to move the case while the group is still held on the under surfaces of the magnets.

The succeeding article group propelled by the next pusher rod 19 will follow the case with the preceding group partially inserted therein. Such succeeding group will move in between the guide plates with comparative ease since the plates will merely swing forward and laterally to allow the group to slip past.

The positive case stop 140 will be controlled as will later be explained to control the release of a case for every two article groups passing the loading station.

Stripper Mechanism

As the case leaves the conveyor section 104 it is delivered to another conveyor section 170, a part of which is driven and the remainder has an anti-friction supporting surface. This conveyor section has side frame members 171 supported on the base frame. At the receiving end of the conveyor 170 there is journalled a shaft 172 carrying a belt roller 173 over which runs a belt 174. Near its receiving end the belt extends approximately horizontally and passes over suitable supporting means, such as the plate indicated at 175. At the forward edge of the support the belt passes over an idler roller 176 and thence extends at a downward inclination to a roller 177, carried on a driven shaft 178 which is journalled intermediate the ends of the frame members 171. The lower run of the belt passes over tightener rolls 179 and 180 which may be mounted in any convenient manner. The remaining portion of the conveyor 170 and the drive for the belt 174 will be described below.

It is to be noted that the case, which has received an article group as it travels on conveyor section 104 at a small angle to the line of travel of the article groups, will begin to travel approximately parallel with the article path as soon as it reaches conveyor section 170. At this point it is desirable to release the article group from the magnetic conveyor and cause the articles to drop to the bottom of the case. While this could be accomplished by deenergizing the electromagnets, it is preferred to force or strip the article group en masse from the magnets. By so doing, the movement of all the articles in the group is accurately controlled and the likelihood of one article lagging behind the others of the group or falling in such a manner as to drag unevenly against the container side wall and jam in falling, is eliminated or greatly minimized.

As best shown in FIGS. 4, 14 and 15, the stripper member comprises a pair of thin, rigid bars of stainless steel or other non-magnetic material, indicated at 183, 183, which are arranged to be received in cut-away portions 181, 181 in rails 182 secured on the pole faces of the magnets so that the exposed faces of the stripper bars 183 lie flush with the rails 182 thus allowing the articles group to slide freely under the stripper bars. The bars 183 are formed with lugs 184, 184 to which the lower ends of links 185 are individually hinged. The upper ends of the links are hinged to a vertically movable member 186 having apertured bosses slideable on vertical guide rods 187, 187 having their base portions secured to a plate 188 connected with the longitudinal frame plates 67, 67. The plate 188 is formed with slots to accommodate the links, enabling them to swing forward as the stripper bar advances a short distance as the articles are pushed down. The links are located so that they may operate in the space between the magnet coils as shown in FIG. 15. The rearward links have an upper extension 185a to which one end of a coil spring 189 is attached, having its other end secured to a bracket 190 fixed to the plate 186. The links are thus urged to swing rearwardly or to the left, as viewed in FIG. 15, to assume normally a vertical position. In the use of the mechanism to handle narrower packages, those, for example, holding a single row of cans, and conveying four narrow packages abreast, an additional stripper bar 183a with similar links 185a will be employed. The middle bar 183a will thus strip the two middle rows of articles. A piston and cylinder unit is employed to move the stripper links down. The cylinder 193 is pivoted at 194 on a frame piece carried by the side plates 67 and has a piston 195 and a piston rod 196. The piston rod is connected to one arm 197 of a bell crank lever pivoted at 198, and the other arm 199 has a yoke engaging the ends of a pin on a lug carried on the underside of the vertically movable member 186. By admitting compressed air behind the piston the bell crank lever may be rocked to force the links 185 down, thus causing the stripper bars to displace articles as they are moved along beneath such bars. The action of the piston is such that the article group is forced down at a speed in excess of that produced by gravity. The articles are thus under full control of the stripper bars during their downward movement and, as the articles move down and forward, the stripper bars will swing forward against the tension of the springs 189. The control means for the piston acts to return the links rapidly to their raised position and, while the links are moving upward, they will swing rearward and the stripper bars will come to rest in their normal position against the rail 182 on the pole faces. As shown in FIGS. 4 and 5, a trip switch 202 may be employed for actuating the stripper when the case advances and contacts the switch. When the switch is tripped by the case, compressed air is admitted behind the piston through a four-way, double solenoid, momentary contact valve, designed to admit air until the piston has moved a predetermined distance and then immediately reverse to admit air in front of the piston to bring the parts quickly back to original position. It is to be noted that the stripper is employed to load only the first, or lower, layer and accordingly the stripper is controlled, as will be explained below, to act upon every other article group.

*Second Loading Station*

The two-layer case, having received its first layer as it passes beneath the stripper, then moves on past roller 176 to the downwardly inclined part of the conveyor belt 174. The second article group continues to follow, spaced from the rear of the case. The conveyor belt moves the half filled case onto the anti-friction portion of the conveyor section 170 where it comes to rest briefly. The portion of the conveyor indicated as a whole at 203 has a first part 204 formed with a number of narrow rollers arranged in staggered relation on closely spaced roller shafts to provide a relatively even surface for the forward edge of the case as it moves off the belt 174. This part extends for approximately a case length. The remaining part of the conveyor indicated at 205 may have more widely spaced rollers.

As the case moves onto the upwardly inclined anti-friction conveyor part 204 it will come to rest with the trailing lower edge engaging the belt 174 which will continue to slip easily past such case, allowing it to remain motionless. The case now is in position to admit the second article group into its upper portion. For this purpose article group guide mechanism 27 is employed, similar to the guide mechanism 25 except that the cams 206 on the supporting arms 207 will be engaged by the end of every alternate pusher rod 19. For this purpose each alternate rod 19 has its ends extending laterally a small distance beyond the other rods and only the ends of the longer rods engage the cams 206. These cams are spaced a small distance farther from the center line of the machine than the cams 163.

The case will remain in stationary position only a short interval. The next following article group will then be inserted into the upper portion of the case and will cause the case to advance by contact with the leading wall similar to the operation at the first loading station. In the operation of the second loading station, however, no stripper is required. The pusher bar will propel the article group to the end of the series of magnets and, as the articles pass the last magnet, they drop into the case. By the time the second pair of articles of a group of four passes beyond the influence of the last magnet, the case will reach a position near the end of the forward part 203 of the anti-friction conveyor section and the momentum of the case will cause it to move beyond the upwardly inclined end portion of the conveyor and onto the take-away conveyor 208. As the top of the case at no time will be in the path of the pusher rods, such rods will of course pass without interference around the sprocket 87 to the return portion of the conveyor.

An eccentrically mounted supporting element 209 is located at this discharge end of the anti-friction section whereby this section may be easily lowered to assist in clearing any jammed cases at this point. The element 209 is also useful in adapting the mechanism for handling single layer cases as will later be explained.

*Case Flap Guides and Hold-Down Means*

Cases which have closure flaps will be delivered onto the case conveyor 22 with front, rear and side flaps spread outward approximately on a plane with the edges of the case walls. This may be done manually or by means forming no part of this invention. As the cases travel along conveyor 22 the flaps are held extended by a hold-down plate 212 supported by rods carried on frame member 12. The plate extends beyond the sides of the cases so that the side flaps will be held down as well as the front and rear flaps.

As the cases advance beyond the end of the hold-down plate 212, which terminates near the discharge end of belts 32 of the conveyor 13, the front and rear flaps are free to contact the dead plate 91 on which the articles move after leaving the conveyor belts. The rear flap presents no problem in this portion of the case travel as it will be kept rearwardly extended because there is not sufficient head room for it to swing up more than a small distance. The side flaps are engaged by rods 213, 213 extending about in line with the plate 212 for a short distance and then are bent inward toward the case side walls and downward to cause the side flaps to swing close to their attached walls. As shown in FIGS. 3, 5 and 14 the plow rods 213 are carried by short, vertically extending rods 214, 214, welded at one end to the plow rods and at their upper ends connected to the frame piece 92 for a portion of the extent of the plow rods and for the remainder of their extent they are connected to the rails 152 which support the lower run of conveyor chain 18. The rod 213 are brought close to the paths of the case walls beneath the article group guide mechanism 25 so that the flaps will assume positions close to their attached walls and thereby permit the walls as well as the flaps to flex somewhat when the guide plates 149 are pressed against the inner surfaces of the walls. The plow rods at their forward ends are terminated adjacent the second article guide mechanism 27.

As the forwardly projecting edges of the leading flaps tend to swing up when freed from the plate 212 and might contact the magnet rail or other parts and cause jamming, or cause the flaps to swing rearwardly, these flaps are held down until the cases arrive at the end of the magnetic conveyor. For this purpose the hold-down mechanism 28 is employed which comprises an endless chain 215 carrying a plurality of hold-down fingers 216. The chains pass around sprockets 217 and 218 located near the rear and forward ends of the magnetic conveyor. The rear sprocket 217 is fixed on the end of a short shaft 219 journalled in a bearing in side frame plate 67 and carries at its outer end a gear 220 meshing with a gear 221 on a shaft 222 extending between the plates 67 and rotatable in journals in such plates. The forward sprocket 218 is likewise secured to a short shaft, indicated at 225, journalled in one of the plates 67 and having a gear 226 fixed thereon outside the plate 67. The gear 226 meshes with a gear 227 fixed on a shaft 228 extending between the plates 67 and journalled in such plates.

The hold-down fingers 216 are preferably flexible and comprise, in the present instance, coil springs secured on pins carried on short, laterally extending plates 229, each having an apertured boss 230 into which an extended conveyor chain link pin 231 is rotatably received. In order to guide the hold-down fingers, a short, radial arm 232 is welded to the boss 230 and the end of this arm carries a cam roller 233. The cam rollers travel in a slot-like opening 234 provided in an elongated cam member 235 during the forward movement of the fingers and in slot-like opening 236 during their rearward movement. For convenience, these openings will be referred to as slots. The length of the arm 232 and the distance between the positions of the chain 215 and opening 234 is such that, when the hold-down fingers are advancing, the fingers will be held approximately vertical as shown in FIG. 21. On the return movement the fingers are held approximately horizontal to keep them out of contact with the parts above the chain 215. This provides a compact construction in the limited space within the confines of the magnet poles and also enables relatively large sprocket wheels to be utilized.

The separate parts of cam member 235 are bolted to blocks 237 secured to one of the side frame plates 67, as shown in FIG. 22.

In order to transfer the cam roller from the lower slot 234 to the upper slot 236 and assure that the fingers will assume the position shown in FIG. 19, a rotatable cam roller control disk 239 is arranged in parallelism with the rear face of the cam member 235. This rotary cam disk is fixed on the end of a short shaft 240 aligned with shaft 225 and journalled in a bearing in the opposite frame plate 67 from the one which supports the shaft 225. The shaft 240 is driven at a speed one-half that of the shaft 225 through a gear wheel 241 fixed on shaft 240 and meshing with a gear 242 on shaft 228. As shown in FIG. 19, the cam member 235 has a curved passageway or slot 243 connecting slots 234 and 236, and the rotary disk 239 has a set of grooves cut in its face into which the outer end of the cam roller is adapted to enter. As shown in FIG. 18, the roller projects through the cam member 235 far enough so that its end may travel in the grooves of disk 239. The configuration of these grooves is obtained by plotting and may be described as in the form of two symmetrical curved sections 244 and 244a which join with a straight, radially extending section 245 in generally a Y-shape. The rotation of the disk is timed so that the mouth of groove section 244 will be in registry with the slot 234 as the cam roller reaches the edge of the disk. The roller then moves both in the slot and in the groove as the disk rotates. When the roller reaches the junction of the curved and straight sections it will move some distance outward along the straight section and then will reverse and move inward and thence along the other curved section 244a. The disk in its movement, causes the roller 233 to move at a continuous rate around the curved slot portion 243 and then into the horizontal section 236. As the mouth of groove 244a comes into registry with the slot section 236 the roller leaves groove 244a and continues in such slot section 236. Continued rotation of the disk will bring the mouth of groove 244 again into registry with the lower slot 244 in time to receive the cam roller of the next hold-down finger. The cam disk serves as a positive means for assuring that the cam roller will continue its movement around the slot 243 and enter the horizontal slot 236 in an advanced position with respect to the hold-down finger, as shown in FIG. 19. Without cam disk 239, or other means equivalent thereto, the cam roller 233 would assume a trailing position and the hold-down finger would continue to extend at right angles to its path rather than parallel with such path as shown.

At the rear end of the travel of the hold-down fingers positive means are provided for swinging the hold-down finger arms 232 forward so that the fingers will assume positions at right angles to the travel of the chain 215, as shown in FIG. 21. For this purpose a rotatable cam-roller control disk 249, arranged in close relation to the elongated cam member 235, is fixed on a short shaft 250 aligned with shaft 219 and journalled in a bearing in the opposite frame plate from the one which supports the shaft 219. The shaft 250 is driven at a speed which is one-half that of the shaft 219 through a gear wheel 251 fixed on a shaft 250 and a meshing gear wheel 252 fixed on a shaft 222. The cam member 235 has an oval shaped slot 253 connecting slots 236 and 234, and the rotary disk 249 has a set of grooves cut in its face to receive the outer ends of the cam rollers 233. These grooves comprise two curved grooves 254a and 254b, which merge into a straight, radially extending groove section 254c. The grooves are arranged in V-shape and are symmetrical with the axis of the disk. Their particular configuration, as shown in FIG. 21, is obtained by plotting.

As the disk is rotated to bring the mouth of the groove 254a into register with the upper slot 236, the end of the cam roller which has been travelling along the slot 236 will enter the groove and, as the disk continues to rotate with the cam roller held both in the grooves and in the oval slot portion 253, the cam roller will move outward of the disk into the radially extending section 254c, then reverses and moves inward of such portion and thence along the other curved section 254b.

The disk 249 in its movement causes the roller 233 to move around the oval slot and then into the lower horizontal section 234. As the groove 254b comes into registry with the slot 234 the roller leaves the groove and continues along the slot. Continued rotation of the disk will bring the mouth of groove 254a again into registry with the upper slot 236 in time to receive the cam roller of the next hold-down finger. During the course of the travel of the cam roller within the grooves of disc 249, the roller, which had previously been caused to advance with respect to the hold-down finger, now is retarded, that is, the roller will travel to the rear of its hold-down finger, and the finger is thereby caused to assume a position at right angles to its line of travel.

Since the linear speed of the finger, as it moves along the lower slot 234, is the same as the speed of the pusher rods 19, and as the timing is such that the finger will engage a forwardly extending flap on a case as it begins to move away from the first loading station, it is clear that the finger will hold the flap in forwardly extended position in its travel along the magnetic conveyor until it reaches a point near the end of the conveyor where the case must pause at the second loading station to receive its top layer of articles. After the case stops, the hold-down finger slips off the extended flap and shortly thereafter moves up and around on the return portion of the finger conveying chain.

Trailing Flap Hold-Down Means

In filling cases having closure flaps with its second article group or layer, it is important to hold the trailing flap down so that, when the case comes to a stop at the second loading station, the oncoming article group, destined for the top layer of the case, will not strike this flap. It is preferred to have positive means for engaging the trailing flap and moving it down at the moment the case reaches its position at the second loading station. For this purpose a flap engaging rod, illustrated in FIGS. 4, 23 and 24, is pivotally mounted at the side of the path of travel of the case. The rod is designated at 255 and has a free end portion which can extend a sufficient distance to contact the flap. The rod 255 has a square portion 256 which is pivoted on a horizontal pin 257, extending through this portion with the ends of the pin carried in a yoke element 258 so that the rod may pivot in a vertical plane. The yoke 258 is carried on the upper end of an oscillating shaft 259 held in upper and lower bracket arms 260 and 261 secured on an upright frame piece 262 secured on the base frame.

The square portion 256 carries at its free end a cam roller 263 adapted to move along the variable cam surfaces on cam element 264 which has a curvature conforming to the arcuate path through which the roller travels about the axis of the vertical shaft 259. On one portion 264a of the cam, the roller 263, when travelling thereon, holds the rod 255 in an approximately horizontal path. The initial position of the rod is forwardly directed and out of the path of the advancing case. Rotation of the yoke element will bring the roller 263 onto the upwardly inclined cam surface 264b which will cause the free end of rod 255 to move down as it swings rearwardly. The mounting of the rod is such that it will engage the trailing wall flap while moving generally in a horizontal plane. The contact with the flap will be along a line spaced somewhat above the flap hinge to minimize the leverage needed to swing the flap and assure its free swinging movement.

The mechanism for swinging the shaft 259 comprises a cylinder 266 having a piston 270 and a piston rod 267. The piston rod is connected to a crank arm 268 fixed on the shaft 259. The cylinder is mounted on a pivot 269 at its closed end to permit swinging in a horizontal plane. The roller 263 is held yieldably on the cam face by a suitable coil spring 274 secured at its upper end to an extended part of the roller spindle and at its lower end to an extended part on the crank arm 268.

The piston 270 is actuated by compressed air controlled through a suitable solenoid valve 273 which may be of the type referred to as a four-way, single solenoid air valve. The solenoid is operated by a strip switch 271 having a movable finger 272. The switch is positioned at the second loading station for displacement by the case as it moves into position to receive the second article layer. See FIG. 25. When the switch 271 is moved to its closed position by the case, current from a convenient source will flow through the solenoid winding to move the valve so as to admit air behind the piston to swing the rod 255; and, when the case moves beyond the switch 271, the valve will then move to a position to admit air in front of the piston and swing the end of the rod forwardly out of the case path and in readiness to engage the flap on the next case moving to the loading station.

Thus, when a case comes to rest at the second loading station and engages the trip switch, the rod 255 will first be caused to swing horizontally to a position where the flap will be approximately fully raised. The rod thereafter will swing downwardly as well as rearwardly by reason of the roller 263 travelling on the upwardly inclined cam section 264b. The trailing flap will then remain in approximately a horizontal position, or inclined somewhat downward to provide a clear path for the oncoming article group which will be loaded into the case as the top layer. The exact position to which the flap is moved is not of particular importance so long as it is swung down sufficiently to allow the next article group to move freely over the flap without striking it.

Loading Single Layer Cases

When it is desired to load single layer cases as indicated in FIG. 1a, the two conveyor sections 98 and 104 are raised to an appropriate height. This may vary depending on whether trays are to be filled, or cases with cover flaps, inasmuch as trays may frequently be employed that are of less height than the height of the articles to be loaded. While the sections 98 and 104 are shown in alignment, it is to be understood that they need not be in this relation. It is intended that the receiving end of the conveyor section 98 be adaptable easily to the conveyor system employed in any particular plant. After raising the conveyor sections 98 and 104 a removable conveyor section 275 is placed above the conveyor sections 170 and 203. The rear or receiving end of the removable section is supported by a bracket 276 and its forward or discharge end will extend to the take-away conveyor 208. This discharge end will rest on the end of the roller conveyor section 205 and the end of this section will be lowered by rotating the eccentric supporting element 209 through a one-half turn. The discharge end of the removable section will thus be supported in alignment with the take-away conveyor 208.

Only the electro-magnets in advance of the end of conveyor section 104 are energized and all magnets beyond this point remain deenergized. The stripper mechanism will be deactivated by disconnecting the stripper switch 202. The depressor rod 255 for the trailing wall flaps need not be moved as this rod remains normally out of the conveyor path while inoperative. The trip switch 271 for the depressor rod may be disconnected, and the guide plates of the article guide mechanism 27 will be removed, together with any other parts which would be in the path of the single layer cases.

After making the changes above referred to, the machine will then be in condition to handle the loading of single layer cases or trays. The cases will be moved up and held momentarily against the yieldable stops as above described. The article groups will be guided by the guide plate mechanism 25 and the advancing edge of the article group will move against the leading wall of the upwardly inclined case and propel it beyond the yieldable stops until the major portion of the case length has moved past the end of the conveyor section 104. As the magnets beyond the discharge end of this section are deenergized, the articles will drop into the case as soon as they are propelled beyond the influence of the last energized unit. The filled cases will then travel by gravity down the inclined, removable conveyor 275 and onto section 208 on which the cases will be conveyed to the next desired point.

The mechanism herein disclosed is adjustable for articles of varying heights. As shown in FIGS. 1 and 8b, the longitudinal side plates 67 have their upper edge portions secured to a horizontal angle iron member 277 having laterally extending portions projecting beyond these side plates. Each member 277 has a pair of apertured, threaded bosses one of which is indicated in FIG. 8b, for the reception of a vertical, threaded adjusting rod 279 having its upper and lower ends journalled in parts of the frame 12a. At its upper end the threaded rod has a worm wheel 280 meshing with spaced worm gears 281 and 282 on shafts supported in a double wing bracket 283. A sprocket 284 rotatable with worm 282 is connected with a similar sprocket for a companion threaded rod by sprocket chain 285. The shaft 286 which carries worm 281 is formed with square ends to be received in a crank to rotate the shaft and thereby rotate all of the threaded rods in unison to raise or lower the magnet section and all parts carried on the frame plates 67. Where necessary, driving sprocket chains may be lengthened or shortened by adding or removing links or by other expedients.

Various units of the drive mechanism will now be described. The conveyor chain 18 to convey articles along the magnet section is driven by a motor 289 supported on a raised platform carried by frame pieces 12b. The motor shaft has a sprocket around which passes a chain 290 which passes over a sprocket 291 fixed on shaft 89 which carries sprockets 87 over which chains 18 pass.

The conveyor belt 174 for conveyor section 170 is driven by a sprocket 292 fixed on the shaft 178 which carries belt roller 177. This sprocket is driven from another sprocket 293 through chain 294. The sprocket 293 is fixed on shaft 295 carrying a gear 296 meshing with a gear 297 on a shaft 298. Fixed on shaft 298 is a sprocket 299 driven by a chain 300 passing over a sprocket 301 fixed on the shaft 89.

The chain 215 for the leading flap hold-down fingers is driven by a sprocket 303 fixed on shaft 225. Sprocket 303 has a chain 304 passing thereover which passes in turn over a sprocket 305 fixed on the shaft 89.

The shaft 66 from which the spacer is driven has a gear 306 fixed thereon, meshing with a gear 307 which meshes with a gear 308 fixed on the shaft which carries the rear sprocket 86, 86 for the pusher rod chains 18.

*Automatic Control Mechanism*

Control mechanism is preferably employed for stopping the spacer 14 if the supply of articles in either row on conveyor belts 32 is interrupted, in which case the spacer will remain inactive until normal delivery of articles is resumed. See FIG. 25. When the spacer is inactive it is also desirable to stop releasing empty cases to the loading station, and means are provided for keeping the positive stop 140 in its holding position while there is a deficiency in the supply of articles. Similarly, if there is a lack of sufficient cases on the case conveyor, a control is operated to leave the positive stop in holding position and also stop the group spacer. During stoppage of the spacer and holding of the positive stop, the article conveyor belts and case conveyor belts continue to slip beneath such articles and cases that are present on these conveyors. The chains 18 carrying the pusher rods, the conveyor belts 106, and the chains with the hold-down fingers for the leading case flaps continue to operate even though cases are not present at the loading station and beyond.

Upon resuming normal operation with a full supply of articles and cases, it is important that the timing of the parts is maintained properly. When the spacer resumes operation, it must be kept timed with the pusher rods. Likewise, cases must be released to arrive at the first loading station just ahead of the article group advanced by the pusher rods. Means are therefore provided by which stoppage of the spacer will occur only at a particular point. Preferably this is at the point where the vertical rods on the spacer chains are ready to release an article group. Thus, the spacer could travel the major part of a group length after the signal is received that there is a deficiency in the supply of articles. The case stop, however, continues to operate to release a case for this last article group. If the case at the loading station is to receive two groups, the spacer operates to release two groups.

At a convenient location along the sides of the article conveyor there are placed trip switches, shown at 311 and 312, one for each row of articles. These are represented as mechanical switches but it is obvious that other forms of switches, such as photoelectric means, could be employed. The switches are shown about the distance of three group lengths back from the spacer, but in practice they may be placed at a greater distance. A single trip switch 313 is located at the side of the case conveyor and it is to be understood that this switch may be placed at a greater distance from the case stop. The contacting fingers of the switches are spring loaded toward the articles or cases and, when one or more of the fingers moves inward, signalling the absence of an article or case, the switches set up a condition to control the spacer and case stop. As pointed out above, the stoppage of the spacer and holding of the case stop is deferred until a particular point is reached in the operation of both the spacer and case stop. For this purpose a number of segmented slip rings are employed, as indicated at 314, 315, 316, 317 and 352. These are carried on a shaft 318, see FIGS. 3 and 25, with provision for angular adjustment. The shaft 318 rotates in bearings in cross pieces 319, 320 secured between the side plates 67. Shaft 318 has a bevel gear 321 at one end meshing with a similar bevel gear 322, fixed on the driven shaft 66. The shaft 318 is geared to make one complete rotation for the travel of two pusher rods past a given point.

As the slip rings are all alike, a description of one should suffice. Considering the slip ring unit 314, as an example, it comprises a pair of brushes 314a and 314b, and the rotary part has a complete conducting ring 314c to which a narrow conducting segment 314d is joined. Brush 314a bears on the ring 314c and brush 314b bears on the adjoining surface where it will periodically contact the narrow segment as the rotary part rotates. Current thus can flow between the brushes for short intervals during each complete rotation of the rotary part. By adjusting the slip ring angularly on shaft 318, the point may vary at which current can flow through the brushes.

The switches 311, 312 and 313 each have two sets of contact points, to control the flow of current through two circuits. The two sets of contact points are represented schematically in FIG. 25. The switch elements 311e, 312e and 313e are spring loaded toward their open positions and may be regarded as normally open switches. However, these switches during regular operation of the loading mechanism, will be kept closed by the presence of articles and cases on their individual conveyors. Each of these switch elements is connected respectively with companion elements 311f, 312f and 313f which are normally closed elements but remain open so long as their companion elements are kept closed.

Current passing through the switches and slip rings controls the movement of piston mechanism 76 to engage or disengage the spacer clutch, and likewise controls the piston mechanism for the positive case stop. In the case of the spacer clutch, a suitable solenoid valve 326, which may be of conventional form, of the type referred to as a double solenoid operated, four-way air valve, has one position controlled through conductor 327 and a second position controlled through conductor 328. When current flows through conductor 327 the valve parts operate to admit compressed air, from a convenient source, in front of the piston to move the clutch to disengaged position. Conversely, when current flows through conductor 328, the position of the valve is reversed and air is admitted behind the piston to engage the clutch.

In regard to the positive stop 140, a suitable solenoid valve 330, which also may be of conventional form and of the type referred to as a double solenoid operated, four-way air valve, has one position controlled through conductor 331 and a second position controlled through conductor 332. When current flows through conductor 331 compressed air is admitted in front of the piston to move the stop to case releasing position. Conversely, when current flows through conductor 332, compressed air is admitted behind the piston to move the stop to its holding position. In the event the piston is already in holding position it will, of course, not be moved.

For simplicity of illustration, the return flow of current to the current source is indicated through ground connections.

The normally open switches 311e, 312e and 313e are arranged in series, joined by, and in effect forming a part of, conductor 333, and when all of these switches are brought to their closed position by the presence of sufficient articles and cases, current can flow from the source of current 334, through conductors 335, 326, 333, including the three switches in series, to the brushes 315a and 317a of slip rings 315 and 317, thence through the slip rings during selected short periods, thence through brushes 315b and 317b to alloy current to flow through conductors 328 and 331. As previously stated, current passing through conductor 328 controls the admission of air behind piston 83 to cause engagement of the spacer clutch. Current through conductor 331 controls the admission of air ahead of the piston 143a to retract the stop 140 to case releasing position.

The switches 311f, 312f are arranged in parallel in conductors 339a, 339b and 339c and each one is connected to conductor 340 at one end, which is joined with conductor 335. At the other end these three conductors are joined to a conductor 341 connected to brushes 314a.

As long as switches 311e, 312e and 313e are kept closed by a continuous flow of articles and cases, no current will flow through slip ring 314. However, when one of these switches is opened, its companion switch will move to closed position which will complete the circuit to disengage the spacer clutch except for the slip ring 314. Before the circuit is completed the narrow segment 314d of the slip ring must move beneath its brush 314b. The movement of the slip rings, as previously stated, is timed with the travel of the pusher rods 19 and it is preferred to time the clutch disengagement so that an article group is trapped within the spacer. The slip ring 314, therefore, is adjusted to come into contact with its brush just before the vertical rods of the spacer have moved far enough to release an article group.

When the supply of articles or cases is resumed and all the "e" switches are closed, this will permit periodic flow of current through slip ring units 315 and 317.

Considering first the slip ring 315, the narrow segment 315d must first move beneath its brush 315b to complete the circuit through conductor 328 to the solenoid valve 326 to cause reengagement of the clutch for the spacer. This reengagement is timed so that the trapped article group, when released, will move forward and become spaced from the succeeding group at exactly the right time to admit a pusher rod 19 in the space created by the travel of this group.

Now, considering slip ring 317, the narrow segment 317d must move beneath its brush 317b to complete the circuit through conductor 331 to the solenoid valve 330 to cause the stop to move to released position. This is timed so that a released case will advance to the loading station and come to rest against the yieldable stops a small interval before the pusher rod 19, advancing with an article group, makes contact with the guide cams 163, causing lowering of the guide plates into the top part of the case.

The periodic movement of the positive case stop to holding position is handled through slip ring 316. This slip ring is connected directly to the source of current through conductor 323 which is joined to the brush 316a. When the narrow segment 316d moves beneath brush 316b, current will flow through conductor 331 to project the stop to its case holding position. The advance of the stop to holding position is preferably timed so that the stop will be projected to engage the side of the released case after such case has moved a distance a little more than one-half its length. The position of the narrow segment 317d, controlling release of the case, is therefore adjusted to an angular position approximately 45° ahead of the position of the narrow segment 316d of the slip ring 316.

When any of the "e" switches move to open position, breaking the circuit to the slip ring 317, controlling retraction of the stop, it is clear that the stop will not be able to move to releasing position until all the "e" switches are again brought to closed position.

The stripper mechanism is intended to operate upon each alternate article group. As previously explained, the cylinder 193 is connected to a source of compressed air through a solenoid valve which is controlled to admit air to advance the piston and then immediately reverse the piston to bring the stripper parts quickly back to original position. In FIG. 25 the solenoid valve is designated at 351 and is of the type described as a four-way, single solenoid, air valve. As current passes through the winding, the spool is moved to a position admitting air behind the piston which forces the strippers down. Preferably the spool is moved quickly to its previous position to raise the strippers. The trip switch 202 is normally open and is moved to closed position as the case comes into contact with the trip finger. When the switch closes, the current will flow to the solenoid through a slip ring unit 352 secured on shaft 318. As in the case of the earlier described slip rings, the slip ring 352 has provision for angular adjustment. This ring will be so adjusted to cause the narrow segment to move out of contact with its brush within a very short interval after the case engages the finger of the trip switch. Thus, even though the trip finger is held displaced until the case passes beyond the finger the current to the solenoid will be discontinued after the desired short interval.

While the mechanism has been illustrated and described as being vertically disposed with the conveyors running horizontally, it is not essential in every embodiment of the invention that the mechanism employed be set upright. It is to be understood that reference to the operating parts in vertical or horizontal positions is for convenience of description and that it is not in every case essential that the parts of the mechanism be so disposed. It is also apparent that the machine is not limited for use solely with magnetic gripping means to load articles into cases. It is within the scope of the invention, in certain embodiments to employ gripping means other than magnets to handle the articles to be loaded.

From the foregoing description it is apparent that the mechanism of the present invention is well suited for the rapid and accurate loading of packages of filled cans or other articles into cases, either in a single layer, or more than one layer, and that the loading is done in a substantially continuous operation. The movement of the articles to the cases is handled in substantially a straight line operation which provides distinct advantages over machines in which the articles to be loaded must change their directions during the course of their travel to the loading point.

By first conveying the articles in rows in abutted relation and then separating the articles into groups, the delivery of full and complete layers into the cases is assured. Due to the construction of the movable guides which facilitate introduction of the article groups into the cases, the likelihood of stoppage of the operation by distorted paperboard cases is greatly minimized as the guides move into the cases well spaced from the inner sides of the case side walls and then are spread apart by movement of the article group into loading position. By the use of guides of this construction it is feasible to employ cases with a very small tolerance between the interior case dimensions and the dimensions of the article group.

Due to the arrangement by which the pusher rod conveyor chains, the handle folding plows, the article group guides, the stripper mechanism and flap hold down mechanism are all carried on a single frame with the magnet units, it is a relatively simple matter to adjust the machine to handle varying heights of can packages or other articles.

By employing the stripper mechanism for loading the first article layer, the separate articles making up the layer will be forced down uniformly as well as rapidly and the possibility of wedging one of the articles against a side wall is reduced to a negligible factor.

By utilizing continuously operating conveying means together with yieldable case stops at the first loading station and delivering the partly loaded case to an anti-friction conveyor section at the second loading station, allowing the cases to come to rest momentarily at these loading stations to receive articles, there is avoided any necessity of synchronizing the driving mechanism for conveying the cases and the articles.

It is apparent that numerous changes may be made in the mechanism herein described without departing from the spirit of the invention, and it is desired that the present embodiment of the invention be considered in all respects as illustrative rather than restrictive, reference being had to the appended claims rather than to the foregoing description to indicate the scope of the invention.

We claim:

1. In a case loader, a feeding conveyor for delivering a row of abutted articles to be loaded into cases, means for forming spaced groups of articles on the conveyor of a size receivable into a case, a case loading station, a case conveyor adapted to carry rectangular, open-top cases to the loading station, an article conveyor adapted to grasp and carry a segregated group of articles from the feeding conveyor to the loading station, the case conveyor having associated therewith a yielding, displaceable stop, said case conveyor being continuously operating to urge a case against the stop with sufficient force to hold the case thereagainst but without displacing the stop, the case conveyor at the loading station being in convergent relation to the article conveyor, whereby the free, leading portion of the group of articles carried by the article conveyor is adapted to enter at an angle into the case at the loading station and engage the free edge of the leading wall of the case, the force of the article conveyor being sufficient to displace the yielding stop and cause the case to advance when the article group is brought against the leading wall and progressively delivered into the case.

2. In a case loader, a loading station, a case conveyor for delivering an empty rectangular, open top case to the loading station, a yieldable stop at the loading station for holding an empty case from advancing while the case conveyor continues to operate beneath the case, a withdrawable positive stop element disposed in operative relation to cases carried on the case conveyor at a location rearward of the yieldable stop, an overhead article conveyor adapted to grasp and carry an article group for deposit into a case at the loading station, the case conveyor being disposed at an angle to the article conveyor, whereby the article group first enters the leading portion of the case and by exerting pressure on the leading case wall carries the case past the yielding stop and inserts the article group into the case as it advances, and control means timed with the article conveyor for withdrawing the positive stop element to release a succeeding empty case and thereafter to reactivate the positive stop element to hold the next succeeding case.

3. In a mechanism for loading a rectangular, open top, shipping case with articles, a loading station including a conveyor for delivering thereto an open top case, means for driving the conveyor, a yielding, displaceable stop element for holding the case at the loading station, the surface of the conveyor being sufficiently anti-friction to slip below the case, and the yielding stop having sufficient holding force to prevent movement of an empty case past the stop, loading mechanism for delivering an article group into a case at the loading station movable in a plane inclined at an acute angle to the plane of the case, whereby the article group will first contact the leading wall of the case, means for advancing the loading mechanism with sufficient force to overcome the action of the yieldable stop and cause the case to advance on the case conveyor.

4. In a mechanism for loading rectangular, open top shipping cases, a loading station including a conveyor for supporting an open top case, loading mechanism for delivering to the case an article group having dimensions closely comparable to the interior of the case, said loading mechanism being adapted to deliver the article group in a plane inclined at a small angle to the plane on which the case is supported at the loading station, whereby the leading edge of the article group is caused first to enter the case at an angle adjacent the upper portion of the leading wall of the case, means for guiding the lateral edges of the article group into the case said means comprising relatively thin spaced guide members disposed in generally parallel relation to the lateral walls of a case at the loading station and movably mounted above the case conveyor, means for moving the guide members into partial lapping relation with the side walls of a case at the loading station, whereby the article group may be moved into the case between the guide members.

5. In a mechanism for loading rectangular, open top shipping cases, a loading station including a conveyor for carrying an open top case, loading mechanism for delivering to the case an article group having horizontal dimensions closely comparable to the internal dimensions of the case, said loading mechanism being adapted to deliver an article group into the case in a plane inclined at a small angle to the plane on which the case is supported at the loading station, whereby the leading edge of the article group is caused first to enter the case at an angle adjacent the upper portion of the leading wall of the case, means for guiding the lateral lower edges of an article group into the case, said means comprising a hinged, elongated frame having a free end portion swingable in parallelism to the lateral walls of a case at the loading station, spaced guide plates supported on the frame and arranged to move into the open case top in lapping relation to the respective lateral case walls, said plates being adapted to receive between them the sides of an article group, and means for moving the frame in time with the travel of the article group loading means to cause the guide plates to enter a case at the loading station and guide the article group into such case.

6. Mechanism as defined in claim 5, in which the guide plates are mounted on the frame by means of mechanism effective to cause the plates to move in parallelism forwardly in the direction of travel of the article group and outwardly, tending to spread outwardly the lateral case walls as the article group, bearing against the surfaces of the guide plates, enters a case at the loading station.

7. In a mechanism for loading a lower layer of magnetically permeable articles into a case dimensioned for two superposed layers, a loading station including a case conveyor for supporting an open top, two-layer case, loading mechanism for delivering to a case at the loading station an article group having dimensions comparable to the horizontal interior dimensions of the case, said loading mechanism comprising elongated magnet means with a uniplaner grasping surface adapted to grasp slideably a group of articles constituting a layer for the case to be loaded, conveying means having pusher members arranged to propel an article group along the uniplaner surface of the magnet means, the case conveyor being spaced from the magnet means a distance in excess of the height of the article layer, means for guiding a group of articles partially into the open top of a case as the case and article group are conveyed, and stripper means associated with the magnet means, including pusher elements having an article group contacting surface substantially aligned with the grasping surface of the magnet means, said pusher elements being mounted for movement toward the case and adapted to exert a sudden thrust on the top surface of the article group to overcome the holding force of the magnet means and force the entire article group as a relatively undisturbed layer uniformly into the case.

8. In a mechanism for loading rectangular, open top, two layer shipping cases, a loading station including a conveyor for carrying an open top case and supporting it at the loading station, loading mechanism for delivering to the case successive article groups having horizontal dimensions closely comparable to the internal dimensions of the case, said loading mechanism being adapted to deliver a first article group, constituting the first article layer, in a plane inclined at a small angle to the plane on which the case is supported at the loading station, whereby the leading edge of the article group is caused first to enter the case at an angle adjacent the upper portion of the leading wall of the case, means for guiding the lateral lower edges of an article group into the case, said means comprising a frame having a portion movable toward the case in parallelism to the lateral walls of a case at the loading station, spaced guide plates supported on the frame and arranged to move into the open top case in lapping relation to the respective lateral case walls, said plates being adapted to receive between them the sides of an article group, said plates additionally being mounted to move forwardly with the travel of the article group and outwardly, tending to exert a spreading force on the inner surfaces of the case side walls, means timed with the travel of article groups to the loading station to move the frame and plates toward the case causing the plates to enter the case and guide the article group therein, said plates being adapted to move freely outwardly and forwardly to permit the passage of a second succeeding article group destined to be deposited in the case as a top layer.

9. In a mechanism for loading cases, a case conveyor, an overhead magnet means having a fixed uniplaner surface disposed above the case conveyor and adapted to engage slideably a group of magnetically permeable articles to be loaded into a case on the case conveyor, means for propelling an article group along the underside of the magnet means, said magnet means having associated therewith movable stripper means having an article engaging surface substantially aligned with the surface of the magnet means adapted to apply downward force to the magnetically engaged surface of the article group to overcome the magnetic attraction and deposited the group into a case positioned below the stripper means.

10. Mechanism as defined in claim 9, in which the stripper means includes a fixed guide frame associated with the magnet means, a support guided for vertical movement on the frame, an elongated, vertically disposed frame pivotally connected at one end to said support, a horizontal stripper bar on the other end of the movable frame, said stripper bar having its lower surface normally disposed in coplaner relation to the plane of the gripping surface of the magnet means, and power means for moving the support downward to overcome the magnetic attraction holding the article group, the pivoted frame on the vertically guided support accommodating the stripper bar to permit it to move forward with the article group and case as the group is stripped from the magnet means, and means for returning the pivoted frame to normal actuating position.

11. In a case loader, a loading station, a continuously operating conveyor for advancing a plurality of empty, uniform-size, rectangular, open-top cases toward the loading station, means for releasably holding an empty case at the loading station to receive its load, means, including an article conveyor, for loading a case and simultaneously advancing such case, a positive stop for controllably releasing cases on the case conveyor for advancing movement toward the loading station, control means timed with the article conveyor and case conveyor for rendering the positive stop inoperative thereby to release a case on the case conveyor for movement toward the loading station and thereafter to reactivate the stop to hold the next succeeding case.

12. In a case loader, a loading station, a continuously operating case conveyor for a row of abutted, rectangular, empty, open-top cases and for delivering cases separately to the loading station, a yieldable stop at the loading station for holding an empty case from advancing while the case conveyor continues to operate beneath the case, a movable, positive stop element located rearwardly of the loading station, means, including an article conveyor, for introducing a load into a case and simultaneously advancing such case past the yieldable stop, control means timed with the article conveyor and case conveyor for rendering the positive stop inoperative to release a case on the case conveyor for movement to the loading station, and thereafter to reactivate the stop to hold the next succeeding case.

13. In a case loader, a constantly operating case conveyor for advancing a row of abutted, rectangular, open-top cases of uniform size, a positive stop element having a part movable laterally inward of the path of cases on the conveyor, whereby it may be moved into and out of case holding position, a yielding stop in advance of the positive stop, adapted to hold a released case from advancing while the conveyor continue to operate beneath the case, means, including an article conveyor, for loading a case held by the yielding stop and advancing the case past such stop, the conveyor having lateral guide bars for cases moving beyond the positive stop toward the yielding stop, the guide bar on the side of the conveyor opposite the positive stop being flared outward and rearward of the case path to permit the rear portion of a case released by the positive stop to be swung out of the normal case path when the stop moves against the trailing portion of a case side wall, the flared guide bar serving to guide the case back into the normal case path as the case is advanced, means timed with the article conveyor and case conveyor for moving the positive stop out of case holding position and for moving the stop back into case holding position before a released case has advanced past the stop, whereby the leading wall of the next case in the abutted row of cases will engage the stop to hold the oncoming row of cases.

14. In a case loader, a loading station, a continuously operating conveyor for advancing an abutted row of empty, uniform-size, rectangular, open-top cases to the loading station, means for releasably holding an empty case at the loading station to receive its load, means including an article conveyor for loading a case and simultaneously advancing such case, a positive stop element for controllably releasing cases for advancing movement toward the loading station, said stop element having a part movable laterally inward of the path of cases on the conveyor, whereby it may be moved into and out of case holding position, the case conveyor having lateral guide bars for cases moving beyond the positive stop toward the loading station, the guide bar on the side of the conveyor opposite the positive stop being flared outward and rearward of the case path to permit the rear portion of a case released by the positive stop to be swung out of the normal case path when the stop moves against the trailing portion of the case side wall, the flared guide bar serving to guide the case back into the normal case path as the case is advanced, means timed with the article conveyor and case conveyor for moving the positive stop out of case holding position to release a case and for moving the stop back into case holding position before the released case has advanced past the stop, whereby the leading wall of the next case in the abutted row of cases will engage the stop to hold the oncoming row of cases.

15. In a loader for paperboard cases having hinged top closure flaps on opposed walls, an overhead, magnetic conveyor having a uniplaner surface along which magnetically permeable articles may be movably held, means for propelling such articles along said surface, a case conveyor disposed below the magnetic conveyor and spaced therefrom a distance less than the height of a case plus the length of the leading case flap measured normal to its hinge line, means for driving the case conveyor, means for transferring articles from the magnetic conveyor to a case on the case conveyor, and means independent of the case and case conveyor for holding the leading, hinged, case closure flap in forwardly extended position as a case is advanced beneath the magnetic conveyor to prevent the free outer edge of the leading flap from engaging the surface of the magnetic conveyor.

16. Mechanism as defined in claim 15, in which pole magnets are employed having their poles spaced transversely of the direction of movement of the articles on the magnetic conveyor, a finger element mounted to travel in the space between the poles of the magnets, means for advancing the finger element at a speed commensurate with the travel of the case conveyor, said finger element being extendable downward below the surface of the magnetic conveyor to engage the leading, forwardly extended closure flap of a case on the case conveyor and hold the free edge of such flap out of engagement with the surface of the magnetic conveyor as such case is advanced.

17. Mechanism as defined in claim 16, in which the finger element is mounted on an endless chain located within the space between the magnet poles, there being guide means located adjacent the endless chain for holding the case flap engaging finger extended on the forward movement of the chain, and additional guide means for holding the finger retracted on its return movement, whereby such finger will be maintained out of contact with the superstructure of the magnetic conveyor.

18. In a case loader for rectangular open top cases, a case conveyor along which a case may be moved, an overhead article conveyor, arranged above the case conveyor said article conveyor including means to support and convey a group of depending articles into loading relation with such case, a loading station arranged to receive cases from the case conveyor, the loading station comprising an anti-friction case support disposed at a small angular relation to the article conveyor, converging in the direction of advancing movement of the articles and on which a case is adapted to rest with the upper edge of its trailing wall positioned outside the line of travel of the depending articles while the upper edge portion of its leading wall is positioned within the line of travel of articles depending from the article conveyor, whereby articles conveyed over the trailing case wall and against the upper portion of the leading case wall will cause advancing movement of the case, and means acting after movement of the case has been initiated for releasing the article group into the case.

19. In a case loader for four-walled, open top cases of the type formed of paperboard and having closure flaps hinged on the upper edges of the walls, a case conveyor along which a case may be moved, such case having a closure flap hinged on its trailing wall, an overhead article conveyor arranged above the case conveyor and adapted to convey depending articles into loading relation with the case, a loading station arranged to receive cases from the case conveyor, the loading station comprising an anti-friction case support disposed at a small angular relation to the article conveyor and converging in the direction of the advancing movement of the articles and on which a case is adapted to rest with the upper edge of its leading wall held in the line of travel of articles depending from the article conveyor, whereby articles conveyed to bear against the upper edge portion of the leading case wall will cause advancing movement of the case, the rear wall of such case on the case support being outside the line of travel of the depending articles on the article conveyor, and means at the loading station for engaging and depressing a flap on the trailing wall of the case, whereby such flap will be moved down to a position outside the line of travel of depending articles on the case conveyor.

20. Mechanism as defined in claim 19, in which the flap depressing means comprises a flap engaging rod carried by a vertical shaft and mounted thereon to swing on a horizontal axis, said vertical shaft being mounted to oscillate on a vertical axis, the flap engaging rod having an end portion extending inwardly over the path of cases moving on the case conveyor and normally held at such distance from the conveyor to permit cases to move freely past such end portion, means for bringing a case to rest with its trailing wall adjacent the flap depressing means, means for swinging the vertical shaft to move the end portion of the flap engaging rod rearward of the case travel and simultaneously swinging such end portion downward on its horizontal axis, thereby to engage and swing downward the flap on the trailing wall of a case.

21. In a case loader for rectangular, open-top cases, a case conveyor including a loading station at which a case may receive a group of articles, an overhead article conveyor arranged above the case conveyor, the case conveyor having two connecting sections, the first of which is inclined to converge at a small angle to the article conveyor in the direction of advancing movement, and the second section being approximately parallel to the article conveyor, the article conveyor including means for firmly supporting and conveying a group of articles in depending relation to such conveyor and into initial loading relation with a case on the first section of the case conveyor, whereby the leading, depending portion of an article group supported and conveyed on the article conveyor will engage inside the top portion of the leading wall of a case on the first section of the case conveyor and propel such case toward the second section as the article group moves within the case, means for driving the article conveyor, and means operable to release the article group from its supported relation to the article conveyor after the case has been propelled by the article group off the first section and onto the second section of the case conveyor.

22. A conveyor for magnetically permeable articles, such as six-sided, rectangular shaped packages of filled cans, the conveyor comprising a magnet group arranged with downwardly disposed pole faces presenting an elongated, uniplaner supporting surface along which such articles may be carried slidably in direct contact with such pole faces and in depending relation thereto, a conveying member having a series of rod-like pusher elements, spaced from each other, movable longitudinally along the magnet surfaces and operable through a path located appreciably below such magnet supporting surface to engage against the trailing, vertical faces of the articles, and means for driving the conveying member to propel articles slidably along the magnet pole faces and in direct contact therewith.

23. A conveyor for magnetically permeable articles, such as six-sided, rectangular shaped packages of filled cans, the conveyor comprising a magnet group arranged with downwardly disposed pole faces presenting an elongated, uniplaner supporting surface along which such articles may be carried slidably in direct contact with such pole faces and in depending relation thereto, a conveying member having a series of rod-like pusher elements, spaced from each other, movable longitudinally along the magnet surfaces and operable through a path located appreciably below such magnet supporting surface to engage against the trailing, vertical faces of the articles, means for driving the conveying member to propel articles slidably along the magnet pole faces and in direct contact therewith, a stripper device comprising a vertically movable, article-engaging element having a surface adapted in one position to lie in the plane of the magnet supporting surface, and means time with the travel of the pusher elements for moving said article engaging element forcibly downward against a conveyed article to disengage the article from the magnet means while the conveying member continues to advance.

24. A conveyor for magnetically permeable articles, such as six-sided, rectangular shaped packages of filled cans, the conveyor comprising an elongated magnet group with downwardly disposed pole faces presenting a uniplaner surface along which articles may be supported slidably in direct contact with and in depending relation to such surface, a flat supporting element aligned with and spaced vertically below the plane of the supporting surface of the magnet group and having an end portion extending underneath such magnet supporting surface, the vertical spacing of the flat supporting element from the magnet supporting surface being slightly greater than the height of the articles to be conveyed, and an endless conveying member having a portion thereof arranged to travel lengthwise of the magnet group and having spaced, rod-like pusher elements operable in a path spaced below the magnet supporting surface and located between the flat supporting element and the magnet supporting surface to engage the trailing vertical faces of the articles and propel them off the flat supporting element and along the magnet supporting surface.

25. A conveyor for magnetically permeable articles comprising an elongated magnet group arranged with downwardly disposed pole faces presenting a uniplaner supporting surface along which such articles may be carried slidably in depending relation to such supporting surface, an endless conveying member having a portion thereof arranged to travel lengthwise of the magnet group and having spaced, rod-like pusher elements operable in a path located appreciably below the magnet group supporting surface and extending longitudinally along the magnet group to a point beyond the end of such group, whereby the pusher elements are adapted to propel such articles along magnet pole faces and to such articles from the magnet group by propelling such articles beyond the influence of the magnets.

References Cited in the file of this patent

UNITED STATES PATENTS

| | | |
|---|---|---|
| 2,651,896 | Woodruff | Sept. 15, 1953 |
| 2,699,278 | Wysocki | Jan. 11, 1955 |
| 2,713,448 | Wimmer et al. | July 19, 1955 |
| 2,714,481 | Bruce | Aug. 2, 1955 |
| 2,805,755 | Jones | Sept. 10, 1957 |
| 2,878,919 | Jones | Mar. 24, 1959 |
| 2,921,425 | Seval | Jan. 19, 1960 |

UNITED STATES PATENT OFFICE
CERTIFICATE OF CORRECTION

Patent No. 3,053,025 September 11, 1962

Biagio J. Nigrelli et al.

It is hereby certified that error appears in the above numbered patent requiring correction and that the said Letters Patent should read as corrected below.

Column 27, line 7, for "time" read -- timed --; column 28, line 16, before "such" insert -- discharge --.

Signed and sealed this 26th day of February 1963.

(SEAL)
Attest:

ESTON G. JOHNSON
Attesting Officer

DAVID L. LADD
Commissioner of Patents